United States Patent
Pisz et al.

(10) Patent No.: US 9,902,266 B2
(45) Date of Patent: Feb. 27, 2018

(54) INTERACTIVE VEHICLE WINDOW DISPLAY SYSTEM WITH PERSONAL CONVENIENCE REMINDERS

(71) Applicants: Toyota Motor Engineering & Manufacturing North America, Inc., Erlanger, KY (US); Toyota Motor Sales, U.S.A., Inc., Torrance, CA (US)

(72) Inventors: James T. Pisz, Huntington Beach, CA (US); Jason A. Schulz, Redondo Beach, CA (US); Kazutoshi Ebe, Novi, MI (US); Pujitha Gunaratne, Windsor (CA); Warren Jing Po Chou, Ann Arbor, MI (US)

(73) Assignees: Toyota Motor Engineering & Manufacturing North America, Inc., Erlanger, KY (US); Toyota Motor Sales, U.S.A., Inc., Torrance, CA (US)

(*) Notice: Subject to any disclaimer, the term of this patent is extended or adjusted under 35 U.S.C. 154(b) by 0 days.

(21) Appl. No.: 14/461,427

(22) Filed: Aug. 17, 2014

(65) Prior Publication Data
US 2015/0077272 A1 Mar. 19, 2015

Related U.S. Application Data

(63) Continuation-in-part of application No. 14/175,862, filed on Feb. 7, 2014, and a continuation-in-part of application No. 14/180,563, filed on Feb. 14, 2014.
(Continued)

(51) Int. Cl.
*G06F 3/048* (2013.01)
*H04W 4/02* (2009.01)
(Continued)

(52) U.S. Cl.
CPC .............. *B60K 35/00* (2013.01); *B60K 37/06* (2013.01); *B60K 2350/1052* (2013.01);
(Continued)

(58) Field of Classification Search
None
See application file for complete search history.

(56) References Cited

U.S. PATENT DOCUMENTS

| 3,129,862 A | 4/1964 | Cone |
| 3,713,090 A | 1/1973 | Dickinson |

(Continued)

FOREIGN PATENT DOCUMENTS

| CN | 101855519 A | 10/2010 |
| CN | 102442250 A | 5/2012 |

(Continued)

OTHER PUBLICATIONS

Machine Translation of DE102007005028.*
(Continued)

*Primary Examiner* — Navid Ziaeianmehdizadeh
(74) *Attorney, Agent, or Firm* — Christopher G. Darrow; Darrow Mustafa PC

(57) ABSTRACT

A system for a vehicle that provides personal convenience reminders to a user of a vehicle. The system accesses an off board system such as a personal electronic device of the user to display the personal convenience reminders. The system can also access various off board applications in response to the personal electronic device of the user to further refine the personal convenience reminders in response to a user selection.

12 Claims, 21 Drawing Sheets

Related U.S. Application Data

(60) Provisional application No. 61/878,898, filed on Sep. 17, 2013.

(51) Int. Cl.
*H04L 29/08* (2006.01)
*B60K 35/00* (2006.01)
*B60K 37/06* (2006.01)
*G08G 1/0962* (2006.01)

(52) U.S. Cl.
CPC .................. *B60K 2350/2052* (2013.01); *B60K 2350/355* (2013.01); *B60K 2350/924* (2013.01); *G08G 1/0962* (2013.01)

(56) References Cited

U.S. PATENT DOCUMENTS

| | | | |
|---|---|---|---|
| 2,465,861 A | 4/1987 | Armin Eisermann | |
| 4,818,048 A | 4/1989 | Moss | |
| 4,942,841 A | 7/1990 | Drucker, Jr. | |
| 4,994,204 A | 2/1991 | Doane et al. | |
| 5,240,636 A | 8/1993 | Doane et al. | |
| 5,454,074 A | 9/1995 | Hartel et al. | |
| 5,574,641 A | 11/1996 | Kawakami et al. | |
| 5,580,140 A | 12/1996 | Katz et al. | |
| 5,589,958 A | 12/1996 | Lieb | |
| 5,652,564 A | 7/1997 | Winbush | |
| 5,705,977 A | 1/1998 | Jones | |
| 5,774,591 A | 6/1998 | Black et al. | |
| 5,784,036 A | 7/1998 | Higuchi et al. | |
| 5,867,802 A | 2/1999 | Borza | |
| 5,920,363 A | 7/1999 | Rofe | |
| 6,148,251 A | 11/2000 | Downs | |
| 6,227,862 B1 | 5/2001 | Harkness | |
| 6,285,952 B1 | 9/2001 | Kim | |
| 6,362,734 B1 | 3/2002 | McQuade et al. | |
| 6,393,348 B1 | 5/2002 | Ziegler et al. | |
| 6,522,027 B1 | 2/2003 | Morillon | |
| 6,654,070 B1 | 11/2003 | Rofe | |
| 6,696,943 B1 | 2/2004 | Elrod et al. | |
| 6,735,517 B2 | 5/2004 | Engelsberg et al. | |
| 6,791,462 B2 | 9/2004 | Choi | |
| 7,050,606 B2 | 5/2006 | Paul et al. | |
| 7,053,866 B1 | 5/2006 | Mimran | |
| 7,095,318 B1* | 8/2006 | Bekhor .................. B60Q 1/503 340/464 | |
| 7,126,583 B1 | 10/2006 | Breed | |
| 7,224,325 B2 | 5/2007 | Nagano et al. | |
| 7,248,151 B2* | 7/2007 | McCall ................. B60R 25/2045 340/425.5 | |
| 7,348,880 B2 | 3/2008 | Hules et al. | |
| 7,398,140 B2 | 7/2008 | Kernwein et al. | |
| 7,561,966 B2 | 7/2009 | Nakamura et al. | |
| 7,561,996 B2 | 7/2009 | Lu et al. | |
| 7,680,574 B2 | 3/2010 | Berg et al. | |
| 7,764,247 B2 | 7/2010 | Blanco et al. | |
| 7,847,678 B2 | 12/2010 | Kawamata et al. | |
| 7,897,888 B2 | 3/2011 | Dimig | |
| 7,982,620 B2 | 7/2011 | Prokhorov et al. | |
| 8,096,069 B2* | 1/2012 | Ishikawa ............... G09F 21/045 345/204 | |
| 8,120,651 B2 | 2/2012 | Ennis | |
| 8,317,329 B2 | 11/2012 | Seder et al. | |
| 8,344,870 B2 | 1/2013 | Evans et al. | |
| 8,395,529 B2 | 3/2013 | Seder et al. | |
| 8,463,488 B1 | 6/2013 | Hart | |
| 8,523,667 B2 | 9/2013 | Clavin et al. | |
| 8,527,146 B1 | 9/2013 | Jackson et al. | |
| 8,552,847 B1 | 10/2013 | Hill | |
| 8,560,013 B2 | 10/2013 | Jotanovic | |
| 8,577,543 B2* | 11/2013 | Basir ................... B60R 16/0373 455/563 | |
| 8,633,979 B2 | 1/2014 | Szczerba et al. | |
| 8,818,647 B2 | 8/2014 | Breed | |
| 8,924,076 B2 | 12/2014 | Boote et al. | |
| 8,942,428 B2 | 1/2015 | Snook et al. | |
| 9,037,354 B2 | 5/2015 | Mondragon et al. | |
| 9,083,581 B1 | 7/2015 | Addepalli et al. | |
| 9,293,042 B1 | 3/2016 | Wasserman | |
| 2002/0022979 A1 | 2/2002 | Whipp et al. | |
| 2002/0029103 A1 | 3/2002 | Breed et al. | |
| 2002/0067289 A1 | 6/2002 | Smith | |
| 2002/0126876 A1 | 9/2002 | Paul et al. | |
| 2003/0034958 A1* | 2/2003 | Waesterlid ............. G06Q 10/02 345/158 | |
| 2003/0076968 A1 | 4/2003 | Rast | |
| 2003/0117728 A1 | 6/2003 | Hutzel et al. | |
| 2003/0190076 A1 | 10/2003 | DeLean | |
| 2003/0204526 A1 | 10/2003 | Salehi-Had | |
| 2004/0052418 A1 | 3/2004 | DeLean | |
| 2004/0090525 A1 | 5/2004 | Eichmann | |
| 2004/0137877 A1 | 7/2004 | Crowhurst et al. | |
| 2004/0208496 A1 | 10/2004 | Pilu | |
| 2005/0125669 A1 | 6/2005 | Stewart et al. | |
| 2005/0221876 A1* | 10/2005 | Van Bosch ............. H04L 12/58 455/575.9 | |
| 2005/0271279 A1 | 12/2005 | Fujimura et al. | |
| 2006/0078691 A1 | 4/2006 | Cherif et al. | |
| 2006/0145825 A1 | 7/2006 | McCall | |
| 2007/0027621 A1 | 2/2007 | Operowsky et al. | |
| 2007/0298885 A1 | 12/2007 | Trab | |
| 2008/0048930 A1 | 2/2008 | Brred | |
| 2008/0051946 A1 | 2/2008 | Brred | |
| 2008/0167892 A1 | 7/2008 | Clark | |
| 2008/0174451 A1 | 7/2008 | Harrington et al. | |
| 2008/0195428 A1 | 8/2008 | O'Sullivan | |
| 2008/0212196 A1 | 9/2008 | Watanabe et al. | |
| 2008/0238667 A1 | 10/2008 | Olson | |
| 2008/0255731 A1 | 10/2008 | Mita et al. | |
| 2009/0067449 A1 | 3/2009 | Tian | |
| 2009/0140878 A1 | 6/2009 | Ryan, II et al. | |
| 2009/0146947 A1 | 6/2009 | Ng | |
| 2009/0264082 A1 | 10/2009 | Tieman et al. | |
| 2009/0278915 A1 | 11/2009 | Kramer et al. | |
| 2009/0290021 A1 | 11/2009 | Rudesill et al. | |
| 2010/0039221 A1 | 2/2010 | Lickfelt et al. | |
| 2010/0045451 A1 | 2/2010 | Periwal | |
| 2010/0075656 A1 | 3/2010 | Howarter et al. | |
| 2010/0083373 A1 | 4/2010 | White et al. | |
| 2010/0127847 A1* | 5/2010 | Evans .................. G06F 3/04817 340/461 | |
| 2010/0225487 A1 | 9/2010 | Desjardins | |
| 2010/0253493 A1 | 10/2010 | Szczerba et al. | |
| 2011/0001932 A1 | 1/2011 | Zuehlsdorff | |
| 2011/0010056 A1 | 1/2011 | Inayoshi et al. | |
| 2011/0045842 A1 | 2/2011 | Rork et al. | |
| 2011/0171941 A1 | 7/2011 | Cusick et al. | |
| 2011/0193939 A1 | 8/2011 | Vassigh et al. | |
| 2011/0271198 A1 | 11/2011 | Brakensiek et al. | |
| 2012/0044352 A1 | 2/2012 | Aimura et al. | |
| 2012/0089273 A1 | 4/2012 | Seder et al. | |
| 2012/0105226 A1 | 5/2012 | Bourdeau et al. | |
| 2012/0209468 A1 | 8/2012 | Thomas | |
| 2012/0229253 A1 | 9/2012 | Kolar | |
| 2012/0232749 A1 | 9/2012 | Schoenberg et al. | |
| 2012/0249291 A1 | 10/2012 | Holcomb et al. | |
| 2012/0262403 A1 | 10/2012 | Tissot | |
| 2012/0265814 A1 | 10/2012 | Roussis | |
| 2012/0296559 A1 | 11/2012 | Gueziez et al. | |
| 2013/0021476 A1 | 1/2013 | Trummer | |
| 2013/0030645 A1 | 1/2013 | Divine et al. | |
| 2013/0054701 A1 | 2/2013 | Leeder et al. | |
| 2013/0063336 A1 | 3/2013 | Sugimoto et al. | |
| 2013/0066526 A1 | 3/2013 | Mondragon et al. | |
| 2013/0166391 A1 | 6/2013 | Blow et al. | |
| 2013/0231800 A1 | 9/2013 | Ricci | |
| 2013/0238165 A1 | 9/2013 | Garrett et al. | |
| 2013/0244634 A1 | 9/2013 | Garrett et al. | |
| 2013/0258693 A1 | 10/2013 | Hatakeyama et al. | |
| 2013/0261871 A1 | 10/2013 | Hobbs et al. | |
| 2013/0300644 A1 | 11/2013 | Chen et al. | |
| 2013/0314257 A1 | 11/2013 | Macrae et al. | |
| 2014/0007618 A1 | 1/2014 | Brown, III | |

(56) References Cited

U.S. PATENT DOCUMENTS

| | | | |
|---|---|---|---|
| 2014/0015971 A1 | 1/2014 | DeJuliis | |
| 2014/0068713 A1 | 3/2014 | Nocholson et al. | |
| 2014/0082676 A1* | 3/2014 | Barowski | B60K 37/06 |
| | | | 725/75 |
| 2014/0129605 A1 | 5/2014 | Huang | |
| 2014/0239982 A1 | 8/2014 | Alameh | |
| 2014/0282931 A1 | 9/2014 | Protpapas | |
| 2014/0300461 A1* | 10/2014 | Stark | G08B 21/02 |
| | | | 340/457 |
| 2014/0354812 A1 | 12/2014 | Schafer | |
| 2014/0372867 A1* | 12/2014 | Tidhar | G06F 17/243 |
| | | | 715/234 |
| 2014/0379175 A1 | 12/2014 | Mittermeier | |
| 2015/0077235 A1 | 3/2015 | Pisz et al. | |
| 2015/0077237 A1 | 3/2015 | Chou et al. | |
| 2015/0077272 A1 | 3/2015 | Pisz et al. | |
| 2015/0077327 A1 | 3/2015 | Pisz et al. | |
| 2015/0077561 A1 | 3/2015 | Schulz | |
| 2015/0081133 A1 | 3/2015 | Schulz et al. | |
| 2015/0081167 A1 | 3/2015 | Pisz et al. | |
| 2015/0081169 A1 | 3/2015 | Pisz | |
| 2015/0180999 A1 | 6/2015 | Pisz | |
| 2015/0220991 A1 | 8/2015 | Butts et al. | |

FOREIGN PATENT DOCUMENTS

| | | | |
|---|---|---|---|
| CN | 102745141 A | | 10/2012 |
| CN | 102914317 A | | 2/2013 |
| CN | 103158618 A | | 6/2013 |
| CN | 103273885 | | 9/2013 |
| DE | 102007005028 | * | 8/2008 |
| DE | 102012203535 A1 | | 9/2013 |
| EP | 1970265 A2 | | 9/2008 |
| EP | 2441635 | | 4/2012 |
| EP | 2661743 B1 | | 11/2013 |
| EP | 2689966 A1 | | 1/2014 |
| JP | 2001304896 A | | 10/2001 |
| JP | 2007210457 A | | 8/2007 |
| JP | 2008143220 A | | 6/2008 |
| JP | 2008225889 A | | 9/2008 |
| JP | 2010532287 A | | 10/2010 |
| KR | 1020070049338 A | | 5/2007 |
| WO | WO 2013034556 A1 | | 3/2013 |
| WO | WO2013101046 A1 | | 7/2013 |

OTHER PUBLICATIONS

Apple Inc., "Apple CarPlay the best iPhone experience on four wheels.", 2104 in 29 Pages.

Fleischfresser, "GM Explores Interactive Backseat Windows", printed from http://www.smartplanet.com/blog/transportation/gm-explore-interactive-backseat-windows/1335 on Sep. 10, 2013 in 2 pages.

Nick Jaynes, (Smart) Walch Your Mercedes From Afar with Pebble Technology on Your Wrist, Dec. 23, 2013, in 3 pages.

International Search Report and Written Opinion for PCT/US2015/046626, dated Dec. 7, 2015, 17 pgs.

* cited by examiner

INTERACTIVE VEHICLE WINDOW DISPLAY SYSTEM WITH PERSONAL CONVENIENCE REMINDERS

CROSS-REFERENCE TO RELATED APPLICATIONS

The present disclosure is a Continuation In Part of U.S. patent application Ser. No. 14/175,862, filed Feb. 7, 2014, and U.S. patent application Ser. No. 14/180,563, filed Feb. 14, 2014, each of which claims priority to U.S. Provisional Patent Disclosure Ser. No. 61/878,898, filed Sep. 17, 2013, which are hereby incorporated by reference.

BACKGROUND

The present disclosure relates to a vehicle and more particularly to systems and methods therefor.

Vehicles often include various systems such as infotainment and navigation systems. These systems are generally provided with a display around which mechanical control elements are arranged to provide a user interface mounted in a dashboard of a vehicle cabin for driver and front passenger access. Alternatively, the display combines at least some of the control elements into a touch panel display.

Conventionally, a vehicle head unit is a hardware interface located in the vehicle dash board and enabling user control of vehicle systems including, but not limited to, the vehicle's entertainment media such as AM/FM radio, satellite radio, CDs, MP3s, video; navigations systems such as GPS navigation; climate controls; communication systems such a cellular phones, text, email; and vehicle control functions such as lights, door chimes, speed control and others. As used herein, the term vehicle head unit refers to such a hardware interface, or to any control module configured to control vehicular systems.

Although effective, the driver and front passenger often refers to a personal electronic device and may need transfer information therefrom into a vehicle system such as the GPS navigation system. Such display and control modules necessarily require the user to be within the vehicle and may thereby be somewhat inconvenient and increase total time within the vehicle.

SUMMARY

The system described herein can be used to deliver personal convenience reminders to a user of a vehicle, including personal convenience reminders specific to weather-related information and travel-related information. The system can also access an off board system such as a personal electronic device of the user, e.g. a tablet, smart phone, or other mobile device to identify upcoming events such as travel. Other off board systems may also be accessed such as a weather application. The system provides personal convenience reminders during "walk-up" or at other times during user/vehicle interactions.

A system for a vehicle, according to one disclosed non-limiting embodiment, includes a user identification subsystem operable to detect a user and a user input subsystem. An interactive display subsystem operable to generate output for display on a vehicle window in response to identification of the user, and the user input subsystem, the output associated with a reminder specific to the user identified from the user input system.

A method of operating a system for a vehicle according to another disclosed non-limiting embodiment includes generating an output for display on a vehicle window in response identification of the user, the output associated with a travel related reminder from a user input system.

A method of operating a system for a vehicle according to another disclosed non-limiting embodiment includes generating an output for display on a vehicle window in response to identification of the user, the output associated with weather-related information from an off board system.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

A system for a vehicle that provides personal convenience reminders is disclosed. The system accesses an off board system such as a personal electronic device of the user to display the personal convenience reminders. The personal electronic device of the user may be a tablet, smart phone, or other device that includes a user calendar that stores upcoming events of the user such as travel. Other off board systems such as an off board weather applications, an off board traffic application, or other internet based application can also be accessed. The system can also access such off board applications in response to the personal electronic device of the user to further refine the personal convenience reminders in response to a user selection. The user selection may include a particular flight from an airline departure board. The personal convenience reminders can be displayed on a window of the vehicle as a personal convenience reminder page such that the personal convenience reminders are readily displayed during "walk-up" or at other times during user/vehicle interactions.

Figure 1:
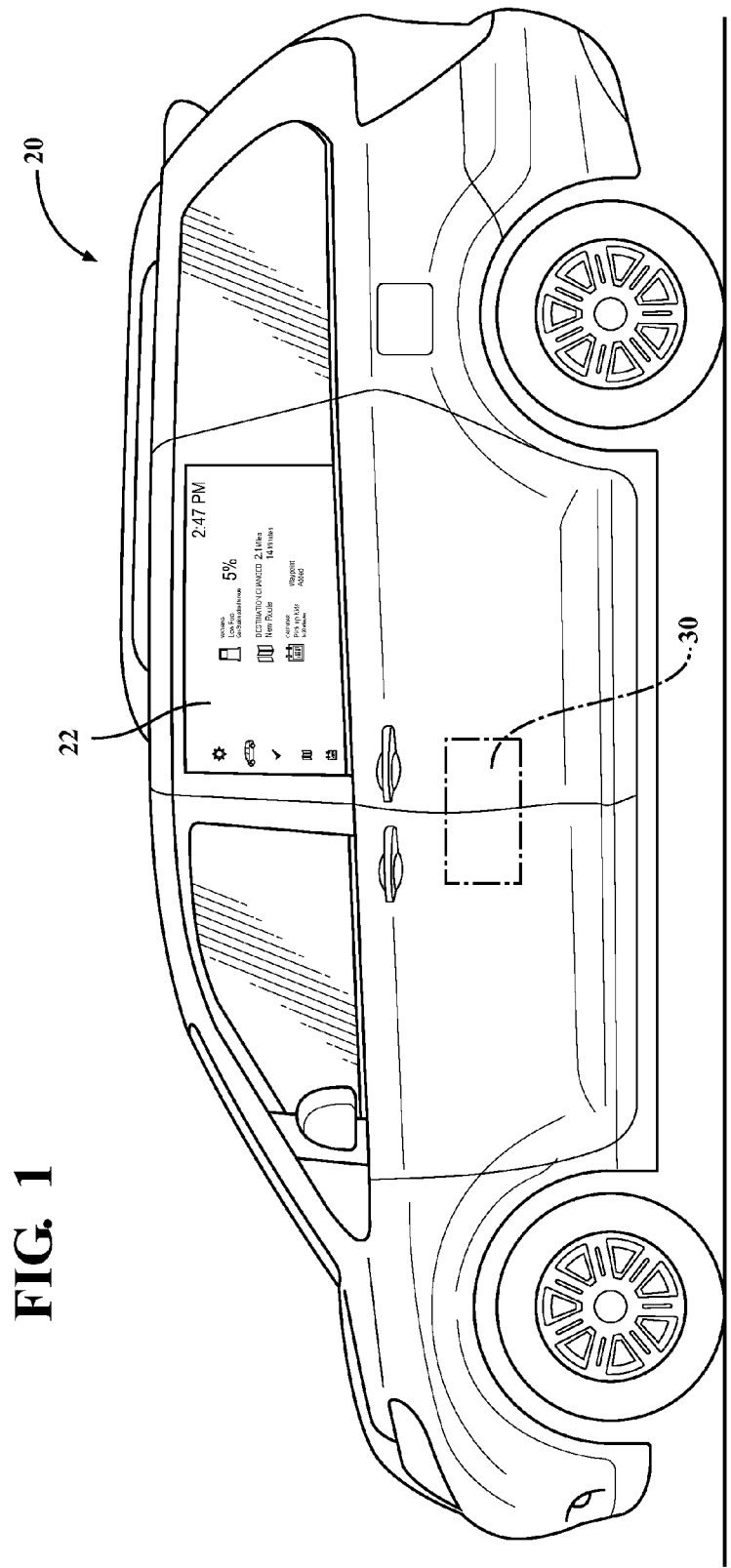
FIG. 1 is a pictorial representation of an example vehicle for use with an interactive vehicle window display system.

FIG. 1 schematically illustrates a vehicle 20 with a window 22 and an interactive vehicle window display system 30. Although the window 22 is here shown as a driver's side passenger window of a minivan type vehicle in the disclosed, non-limiting embodiment, it should be appreciated that various vehicle types and windows will also benefit herefrom.

Figure 2:
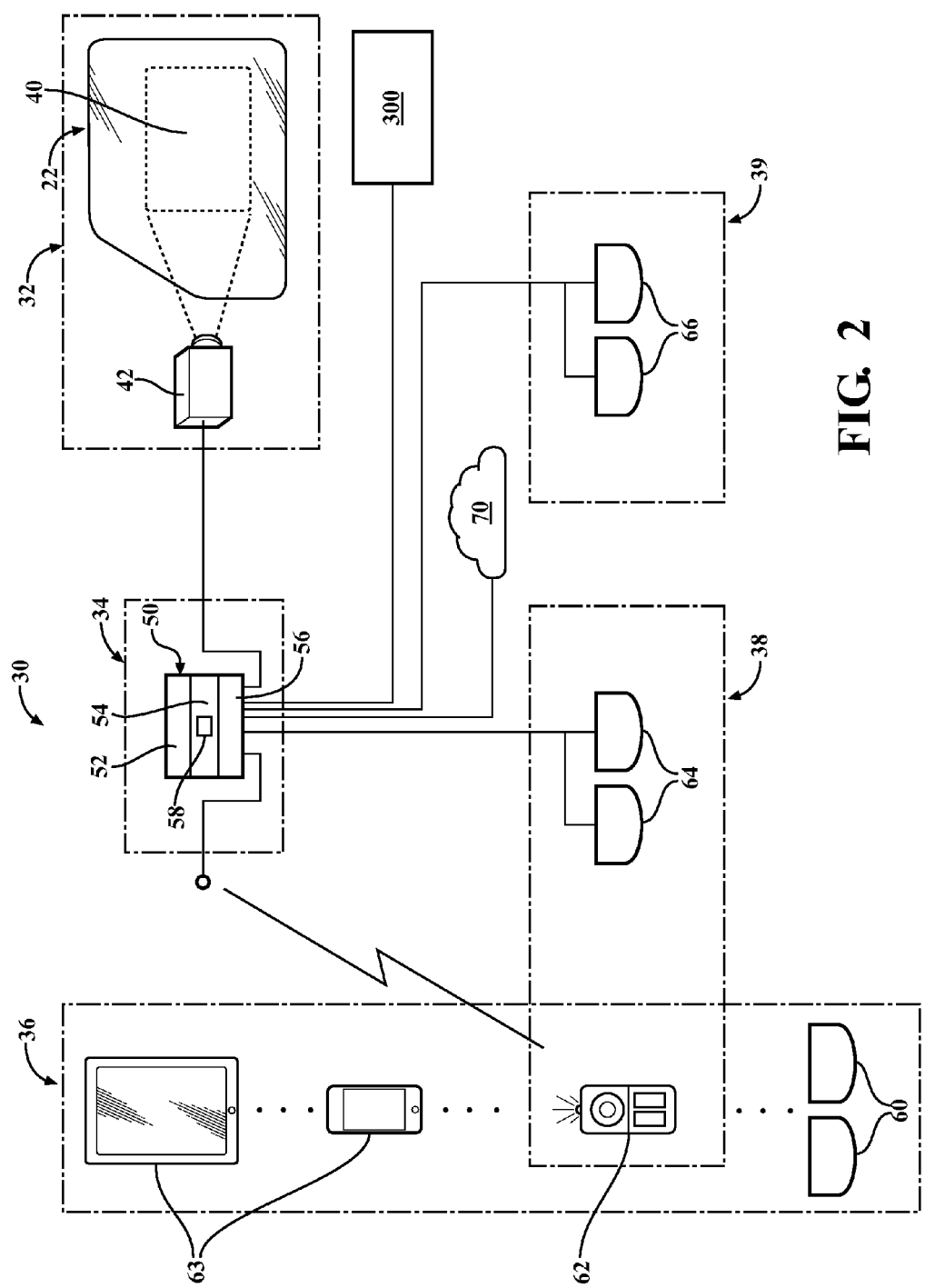
FIG. 2 is a schematic block diagram of the interactive vehicle window display system according to one non-limiting embodiment.

With reference to FIG. 2, selected portions of the system 30 are schematically illustrated. The system 30 generally includes an interactive display subsystem 32, a control subsystem 34, a user input subsystem 36, a user identification subsystem 38, and a user location subsystem 39. It should be appreciated that although particular subsystems are separately defined, each or any of the subsystems may be combined or segregated via hardware and/or software of the system 30. Additionally, each or any of the subsystems can be implemented using one or more computing devices including conventional central processing units or other devices capable of manipulating or processing information.

The interactive display subsystem 32 can include any device or devices capable of displaying images on a vehicle window 22 under the control of system 30, and can be adapted for viewing from outside the vehicle, inside the vehicle, or both. In one non-limiting example the interactive display subsystem 32 can include a display device integral to the window 22, such as an LCD. Such a display can be illuminated by ambient light or by one or more light sources under the control of system 30. Such light sources can be mounted at any operable locations enabling light emission onto a window from inside or outside the vehicle, depending on whether the display is to be viewed by a user located outside or inside the vehicle. Examples of such mounting locations can include in the floor, in the vehicle headliner, within the vehicle door structure, or in the exterior door panel.

Figure 3:
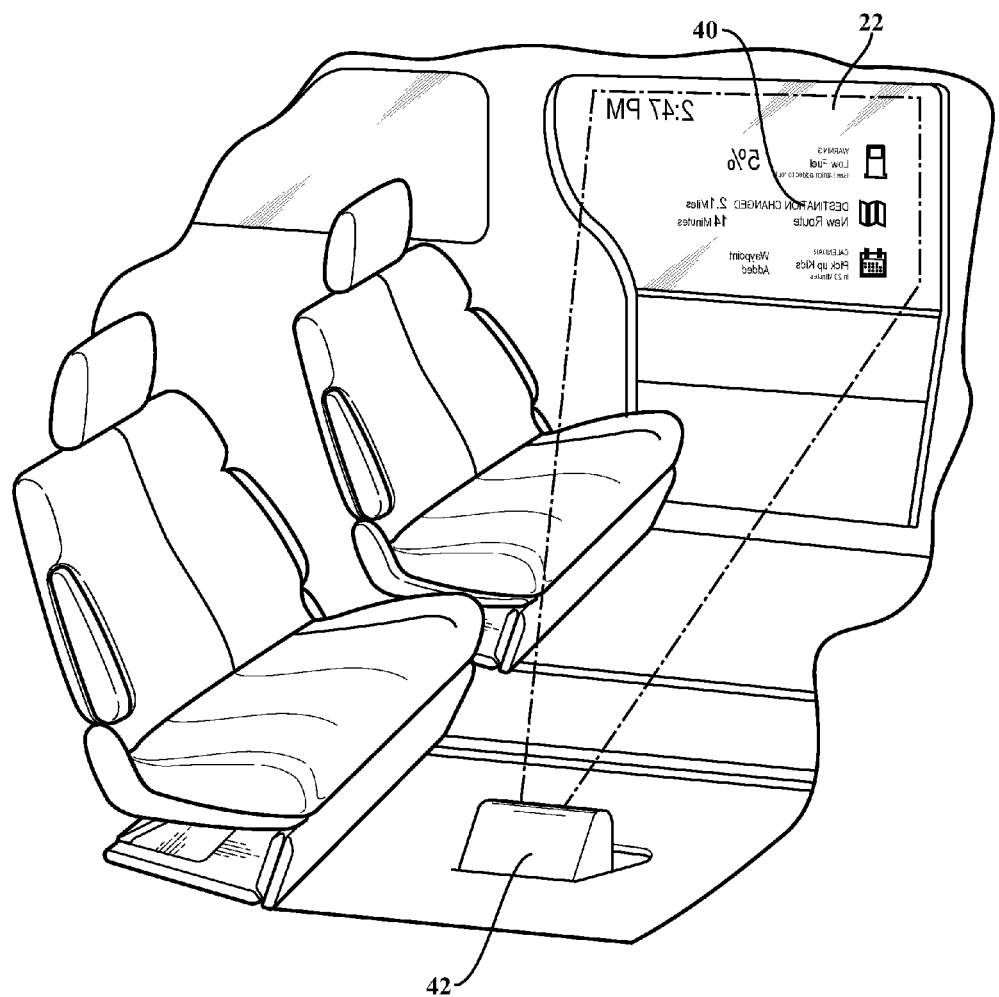
FIG. 3 is a partial interior view of the vehicle with the interactive vehicle window display system.

In another non-limiting example, the interactive display subsystem 32 can include a coating 40 and a projector 42. The coating 40, for example, may be a polymer dispersed liquid crystal (PDLC) film, applied to the window 22 to provide both transparency when inactive and partial or complete opacity when active. The window 22 treated with the coating 40 is thereby operable to display content as a projection page visible from outside and/or inside the vehicle 20 (FIG. 1). The projector 42 can be mounted in the floor (FIG. 3) or other locations within the vehicle 20, such as the vehicle headliner or within the vehicle door structure as well as in locations on the vehicle exterior such as in an exterior door panel. The illustrated shaded area extending from the projector 42 toward the window 22 schematically represents the projection of output in the form of content pages provided by the projector 42. In response to the approach of a recognized user, the coating 40 changes from transparent to opaque so that the projector 42 may project the output onto the window 22.

As will be further described, the displayed content can include personalized information or entertainment content such as videos, games, maps, navigation, vehicle diagnostics, calendar information, weather information, vehicle climate controls, vehicle entertainment controls, email, internet browsing, or any other interactive applications associated with the recognized user, whether the information originates onboard and/or off board the vehicle 20.

The control subsystem 34 generally includes a control module 50 with a processor 52, a memory 54, and an interface 56. The processor 52 may be any type of microprocessor having desired performance characteristics. The memory 54 may include any type of computer readable medium which stores the data and control algorithms described herein such as a user support system algorithm 58. The functions of the algorithm 58 are disclosed in terms of functional block diagrams (FIG. 6) and representative pages (FIGS. 9-14), and it should be understood by those skilled in the art with the benefit of this disclosure that these functions may be enacted in either dedicated hardware circuitry or programmed software routines capable of execution in a microprocessor based electronics control embodiment.

With continued reference to FIG. 2, the control module 50 may be a portion of a central vehicle control, a stand-alone unit, or other system such as a cloud-based system. Other operational software for the processor 52 may also be stored in the memory 54. The interface 56 facilitates communication with other subsystems such as the interactive display subsystem 32, the user input subsystem 36, the user identification subsystem 38, and the user location subsystem 39. It should be understood that the interface 56 may also communicate with other onboard vehicle systems and off board vehicle systems. Onboard systems include but are not limited to, a vehicle head unit 300 which communicates with vehicle sensors that provide, for example, vehicle tire pressure, fuel level and other vehicle diagnostic information. Off board vehicle systems can provide information that includes, but is not limited to, weather reports, traffic, and other information that may be provided via cloud 70.

The user input subsystem 36 can include one or more input sensors including onboard input sensors 60, off board input devices, or both. Onboard input sensors 60 can include one or more motion cameras or other light sensors configured to detect gesture commands, one or more touch sensors configured to detect touch commands, one or more microphones configured to detect voice commands, or other onboard devices configured to detect user input. The user input subsystem can also include off board input devices such as a key fob 62 and/or a personal electronic device 63 of the user, e.g. a tablet, smart phone, or other mobile device.

In some instances, at least one onboard input sensor 60 or off board input device can be integrated into, or operate in conjunction with, the interactive display subsystem 32. In one non-limiting example, the interactive display subsystem 32 includes an LCD display integrated into a window 22 and can operate in conjunction with one or more touch sensors integrated into the window 22, causing the window to function as a touchscreen. In another non-limiting example, the interactive display subsystem 32 includes a projector 42 and coating 40 on the window 22 and can operate in conjunction with one or more motion detectors configured to detect user gesture commands, causing the window to operate as a gesture-based interactive display. Subsystem combinations involving the interactive display subsystem 32 and the user input subsystem and enabling user interaction with a display on a vehicle window 22 will be referred to herein as an interactive window display.

Figure 4:
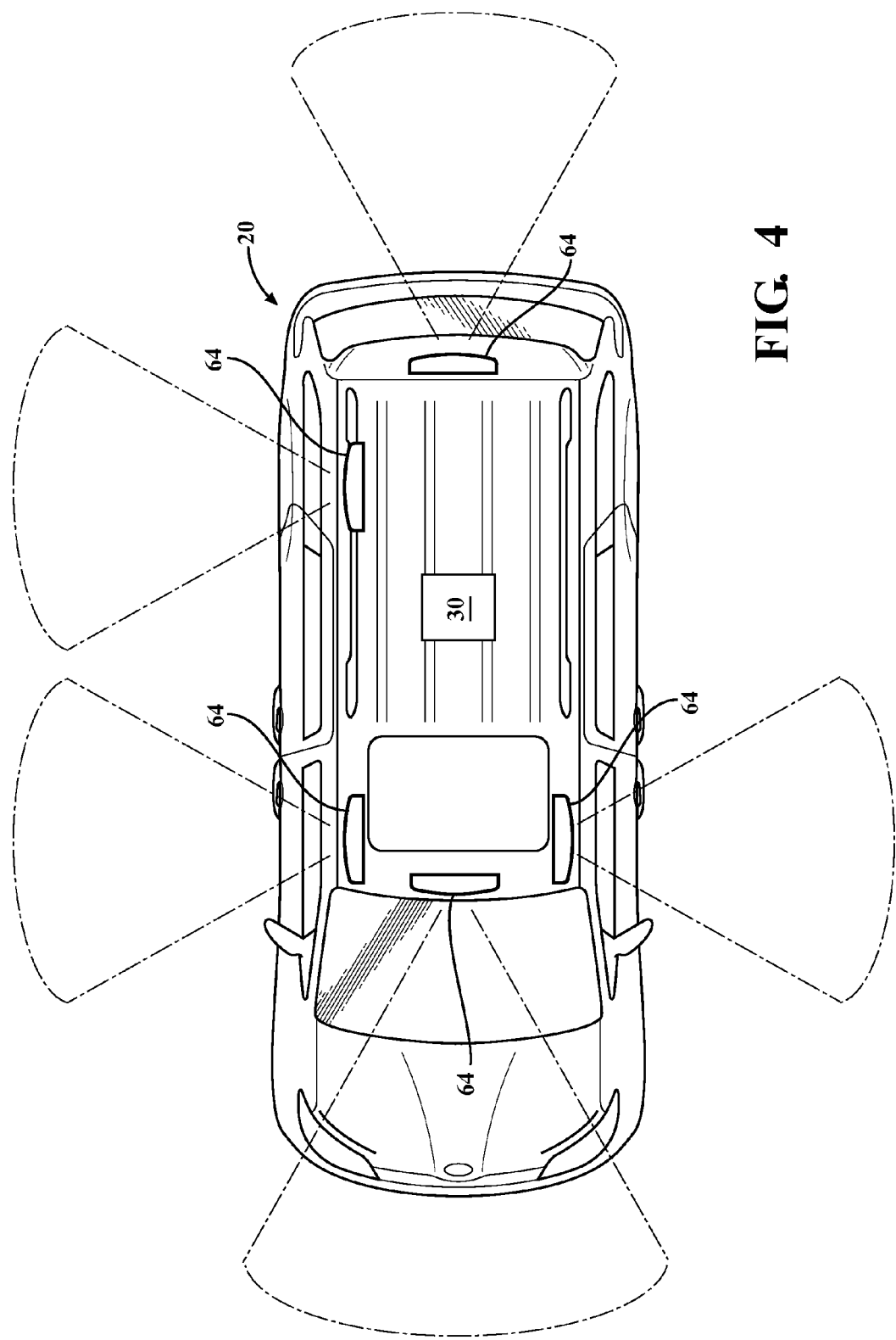
FIG. 4 is a top view of the vehicle illustrating an exterior user identification subsystem of the interactive vehicle window display system.
Figure 5:
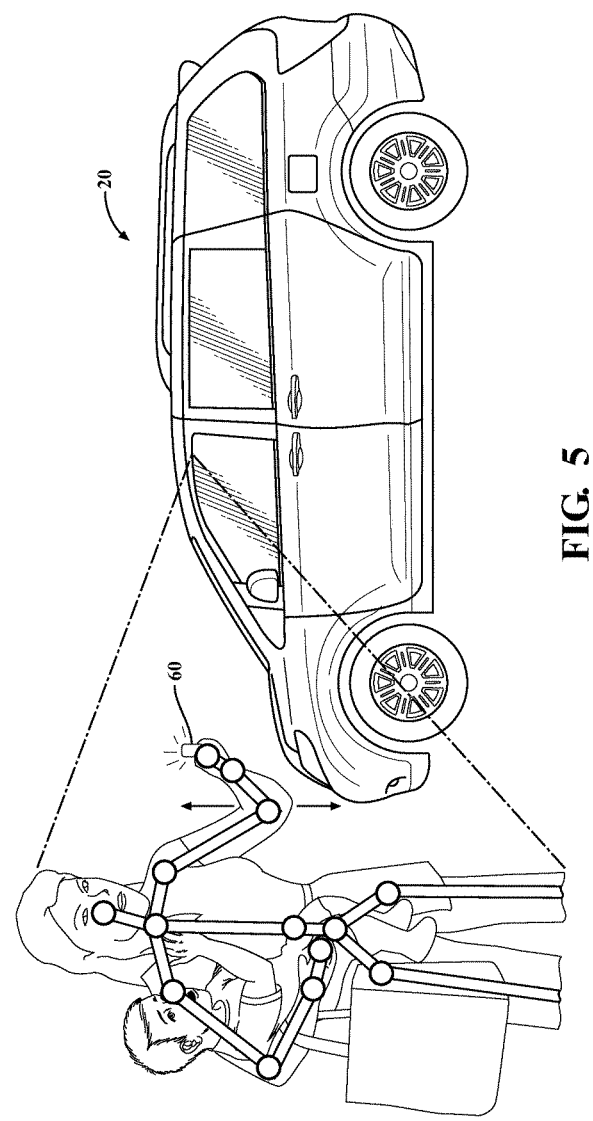
FIG. 5 is a pictorial representation of the vehicle illustrating user identification via a skeletal joint relationship, key fob and/or user gesture.

The user identification subsystem 38 includes one or more identification sensors 64 such as a closed-circuit television (CCTV) camera, infrared, thermal or other sensor mounted to the vehicle 20 to provide a desired field of view external to the vehicle 20 as shown in FIG. 4, internal to the vehicle, or both. One example user identification subsystem 38 can recognize the driver and/or passenger based on image data captured by identification sensors 64, e.g. a skeletal joint relationship and/or other user form data (FIG. 5), separate from, or along with, wireless devices such as the key fob 62 associated with that particular driver and/or passenger. Based at least in part on this identification, the system 30 provides access to interactive interfaces on the interactive display subsystem 32 associated with the particular driver and/or passenger.

The system 30 can store user profiles of known users, the user profiles including identification information relevant to individual users. For example, a user profile can contain skeleton joint relationship data or facial recognition data useable by the user identification subsystem 38 to identify or authenticate a user. A user profile can additionally contain personal interest information, such as personal calendar and event information, driving/destination history, web browsing history, entertainment preferences, climate preferences, etc. In some variations, any or all information contained in a user profile can be stored on or shared with a personal electronic device 63, remote server, or other cloud 70 based system. Such off board storage or sharing of user profile data can facilitate utilization of user profile data in other vehicles such as any additional vehicles owned by the user, rental vehicles, etc. Such user profile data can be secured by being accessible through a password protected application running on the cloud 70 based system, by biometric authentication, or by other effective means.

In some instances, a user profile can additionally contain user access information; data pertaining to whether the user is allowed to control a given vehicle function. For example, the user profile associated with a user can indicate full user access, or function control rights for that user. This can be analogous to the control rights of the administrator of a personal computer. A user profile can alternatively indicate restricted user access. For example, the user profile associated with a child can be set to block the user from accessing certain audio or video controls, the navigation system, altering user profiles, or the like.

Registration of various user profiles with the system 30 can be completed in any manner, for example, over the internet or with a direct vehicle interface. User profiles can be based on the identities of individual users known to or registered with the system, or to user categories, such as "unknown user", or "valet". In different variations, a default user category such as "unknown user" or "valet" can be associated with limited, default access, or can be associated with no access, i.e. complete prohibition of access to the system 30.

The user location subsystem 39, operable to determine the location of one or more users inside or outside the vehicle, includes one or more location sensors 66 such as a pressure sensor, temperature sensor, or camera deployed inside or outside the vehicle. In some cases, a device can serve as both an identification sensor 64 and a location sensor 66. For example, a camera mounted within the vehicle can provide information on a user's specific identity, by means described above, and on the user's location within the vehicle, such as the driver's seat or the front-row passenger's seat. In some cases, elements of the interactive display subsystem 32 can also operate as location sensors 66 within the user location subsystem 39. For example, pressure sensors within a smart screen or motion detectors operating as part of an interactive display can be used to obtain user location information.

In some instances, user access can be based on user location as determined by the user location subsystem 39. For example, second or third row passengers can be allowed or disallowed access to various vehicle functions such as the navigation system. Optionally, a user with a user profile that is associated with unlimited access per the access information associated with the user profile can specify such settings. In some instances, user access can be based on a combination of the user profile as applied by the user identification subsystem 38, and the user location as detected by the user location subsystem 39. For example, a user with unlimited access as specified by the applied user profile can nonetheless be blocked from accessing certain vehicle functions when occupying the driver's seat of a moving vehicle.

Figure 6:
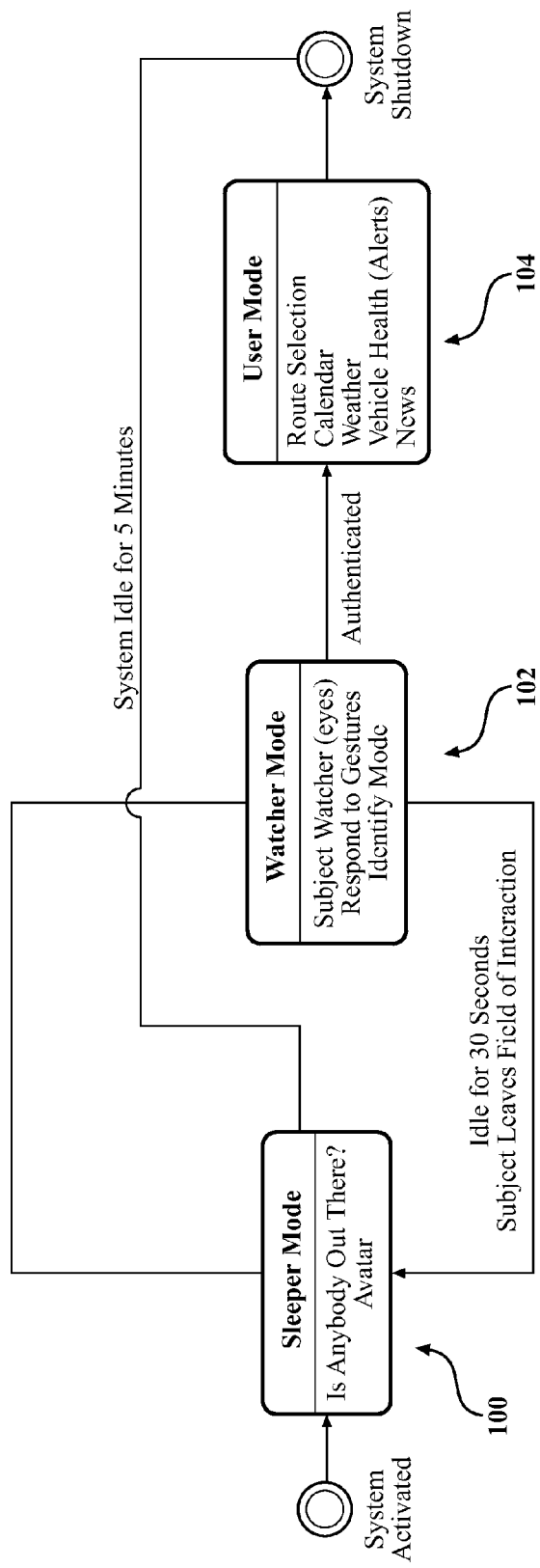
FIG. 6 is a schematic block diagram of an algorithm for operation of the system according to one non-limiting embodiment.

With reference to FIG. 6, operation of the system 30 according to one disclosed non-limiting embodiment generally includes a sleeper mode 100, a watcher mode 102 and a user mode 104. It should be appreciated that other modes may additionally or alternatively be provided.

If the system 30 is active but has yet to detect a user, the system 30 will be in sleeper mode 100 until awakened by the user identification subsystem 38. After detection but prior to identification by the system 30, the watcher mode 102 may be utilized to interact with authenticated as well as un-authenticated persons. For example, when a person approaches the vehicle 20, the system 30 recognizes the direction from which the person has approached then activates the interactive display subsystem 32 to display an avatar, eyes or other graphic. The graphic may be directed specifically toward the direction from which the person approaches, e.g., the graphical eyes "look" toward their approach. Alternatively, an audio capability allows the system 30 to respond to commands and initiate interaction from a blind side of the vehicle 20, i.e., a side without the interactive display subsystem 32. The watcher mode 102 utilizes the user identification subsystem 38 to discriminate between authenticated and un-authenticated persons.

The user mode 104 allows a user with a known operator and/or passenger user profile in the system 30 to make decisions on approach to the vehicle 20 so that so that certain vehicle interactions need not await entry into the vehicle 20.

The user mode 104 reduces distractions through the reduction of travel-associated decisions from the driver's cognitive, visual and manual workload streams once within the vehicle 20. In furtherance of this, the user is presented with an overview of information to include, for example, weather, traffic, calendar events and vehicle health. As will be further described, predictive functions of the system 30 identify likely actions, and offer optimal paths to completion, such as planning an efficient route.

A maximum range of content provision by the interactive display subsystem 32 may be associated with a maximum distance at which that content can be effectively interacted with by the user. In one disclosed non-limiting embodiment, the maximum range of each content feature is prioritized with respect to legibility range of content displayed by the interactive display subsystem 32. This range metric facilitates the determination of the order in which content appears in the walkup experience. Access to prioritized content with greater maximum range allows the walkup experience to begin further from the vehicle 20 to provide the user with more overall time to interact with the system 30.

In one disclosed non-limiting embodiment, the system 30 utilizes a multi-factor authentication for security and authorization. Example multi-factor authentication may include the key fob 62, skeleton joint relationship recognition (FIG. 5), and/or a gesture password (FIG. 8). The user may be provisionally identified with one of these factors, but may require a total of at least two factors to authenticate the user prior to display of certain content. That is, the user will not be granted access to all the features in user mode 104 until a multi-factor authentication is passed and the user is within a predetermine range of the vehicle 20. This authentication process ensures the security of the vehicle and the personal information embedded in the system 30. In one disclosed non-limiting embodiment, the first authentication factor is the key fob 62 and the second is the skeleton joint relationship (FIG. 7) of the user. If the user does not have their key fob 62, the skeleton joint relationship may become the first authentication factor and a gesture password such as a wave or particular arm movement (FIG. 8) becomes the second.

The key fob 62 in one disclosed non-limiting embodiment may be encrypted to uniquely identify each user to the system 30. Additional security protocols such as a rolling time key to ensure that even the encrypted key cannot be intercepted and re-used by unauthorized devices may additionally be utilized.

Once the key fob 62 is recognized, the user will be welcomed and pre-authenticated to allow limited access to selected content in the user mode 104. This will provide the user with enough time to cycle through multiple content features during the walkup experience, yet maintain security with respect to other content features e.g., a destination. Once the user has been fully authenticated, all content features, e.g. destination made during the pre-authenticated state, are validated for display. If the authentication fails, the user will not be granted access to the vehicle 20 or any sensitive information. The system 30 in this disclosed non-limiting embodiment allows pre-authenticated access at about 30-40 feet and full access at about 15-25 feet from the vehicle.

Figure 7:
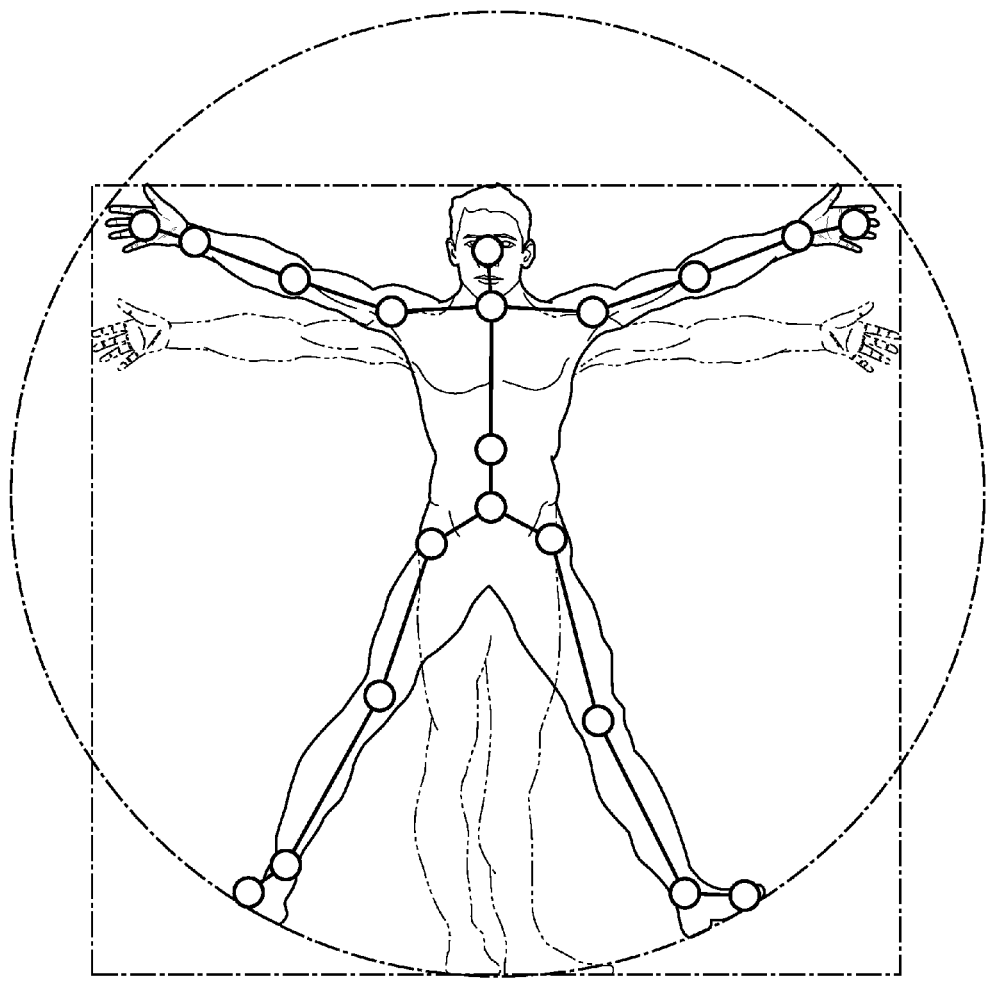
FIG. 7 is a pictorial representation of an example skeletal joint relationship recognizable by the system.
Figure 8:
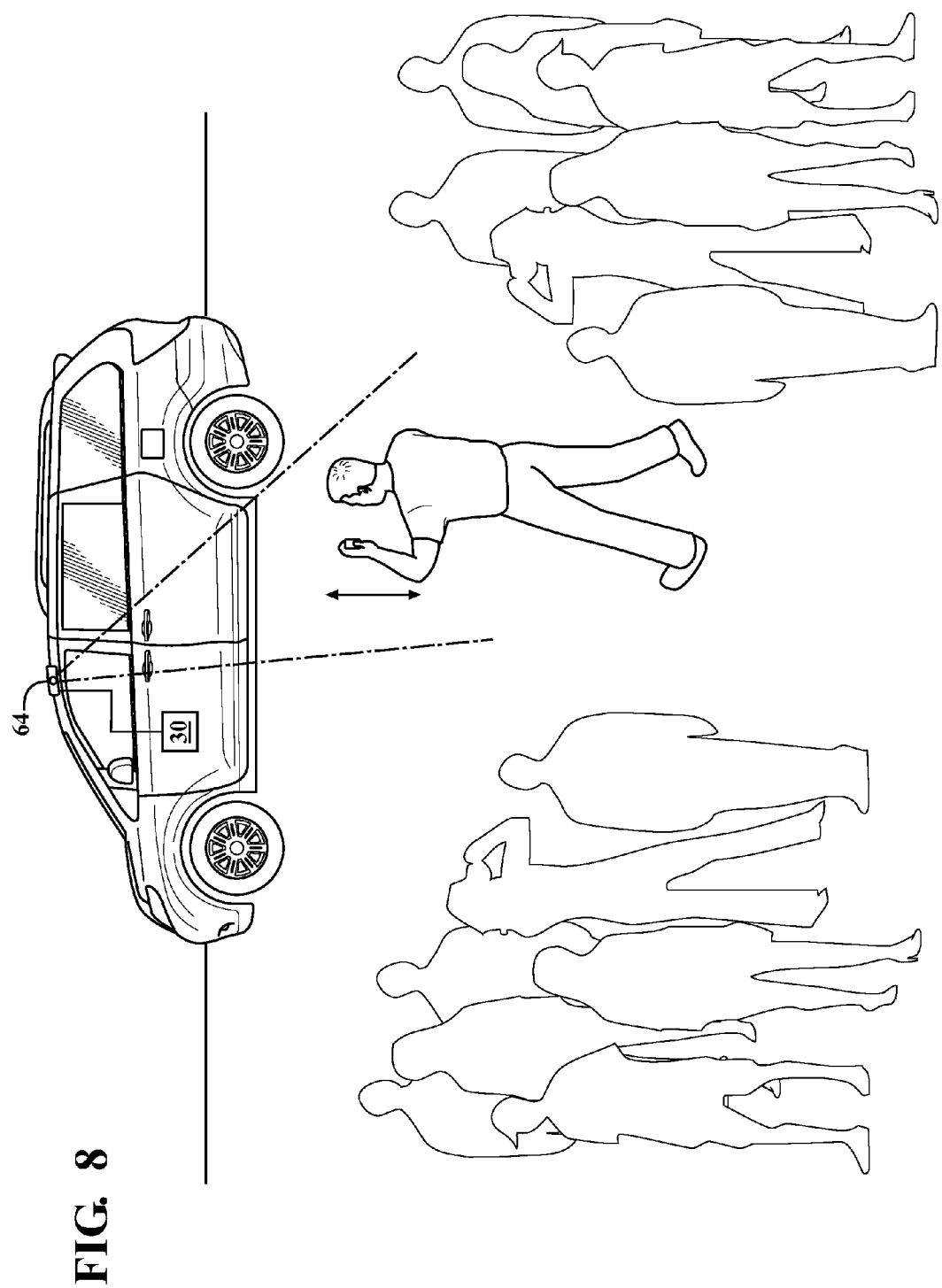
FIG. 8 is an illustration of an example user gesture recognizable by the system.

With respect to FIG. 7, to provide further authentication, the system 30 is operable to recognize a user by his skeleton joint relationships. Skeleton joint relationships in this disclosed non-limiting embodiment facilitate pre-authentication but not full authentication that grants full access to the vehicle 20. However, if the user has been pre-authenticated via the key fob 62, a matching skeleton joint relationship will fully authenticate the user. That is, the user identification subsystem 38 may utilize skeleton joint relationships as the second point of identification.

Figure 9:
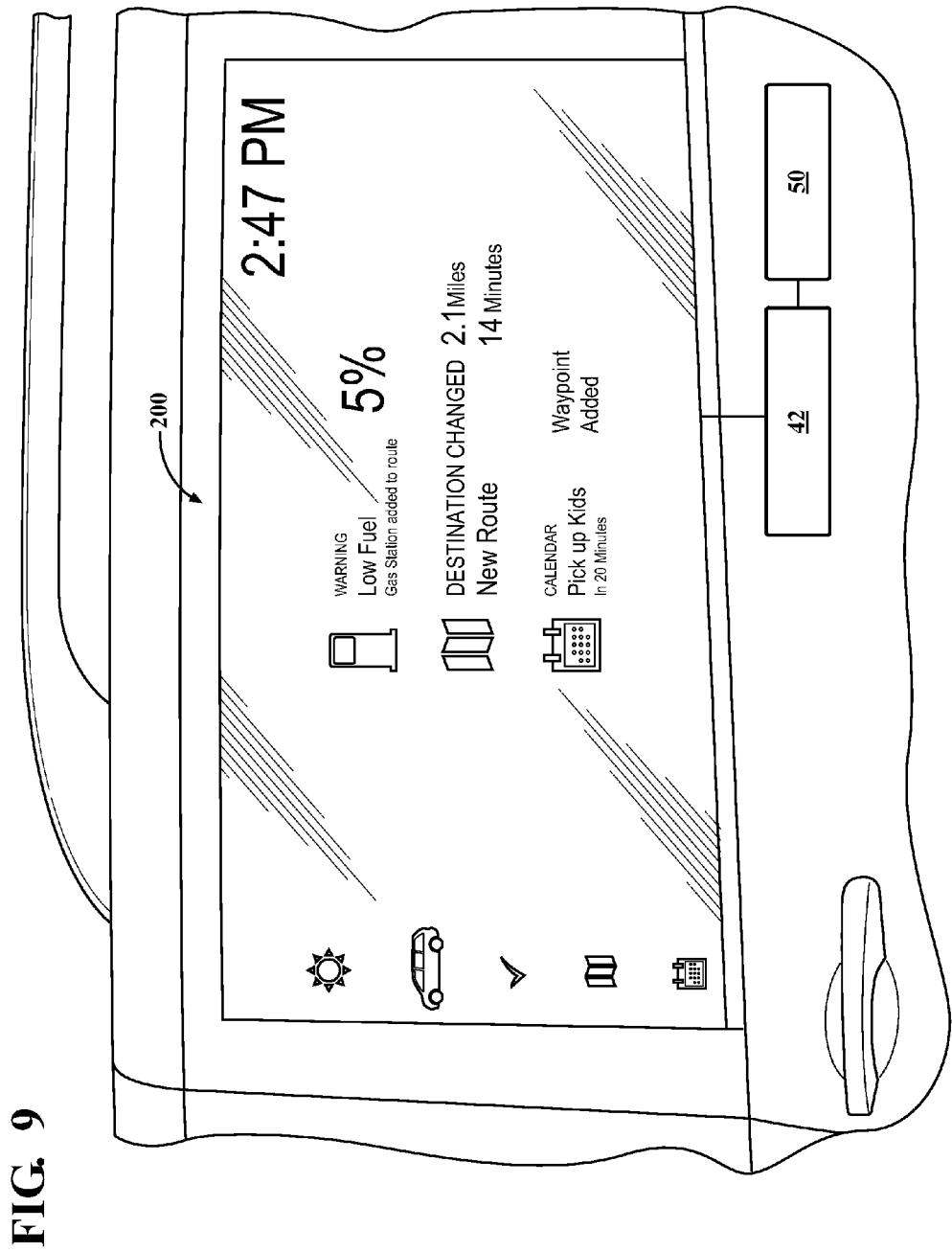
FIG. 9 is an example landing page displayed by the interactive vehicle window display system.

With reference to FIG. 9, once authenticated, the "landing" or "home" page 200 provides a summary of alerts and important information to the user. The landing page 200 provides the user with a readily reviewable overview of the status of the vehicle and how it may affect his schedule and activities. In this example, the content includes time information, vehicle diagnostic information, and personal calendar information. Here shown, a low fuel warning is provided in addition to a traffic-based route update for use by the vehicle navigation system and a calendar event reminder to "Pick up Kids in 20 minutes." In another example, the system 30 will include a fuel station as a stop during route guidance if the destination is a distance greater than the available fuel range. Notably, preferred fuel stations or other stops may be predefined in the user profile.

The landing page 200 further displays a plurality of icons to indicate additional content pages that can be viewed by the authorized user. The landing page 200 itself may be accessed on each content page as an icon such as a vehicle manufacturer mark icon on each content page. The landing page 200 allows the authorized user to understand what vehicle systems or personal user profile items may require further attention and provides access to additional content feature details with regard to these items in the form of navigable icons that lead to additional content pages. The landing page 200 can additionally or alternatively integrate an interactive display, for example, a smart page or video game. Other interactive vehicle display page configurations are also possible.

Selection of content is accomplished with, for example, the key fob 62, user gestures, voice commands, touch inputs, etc. In one example, the user utilizes the key fob 62 to cycle through various pages displayed by the interactive display subsystem 32. In one example, the key fob 62 may include a four button directional pad and two auxiliary buttons. Alternatively, hand gestures may be used to "swipe" between pages. It should be appreciated that although particular pages are illustrated in the disclosed non-limiting embodiment, various alternative or additional pages may be provided.

Figure 10:
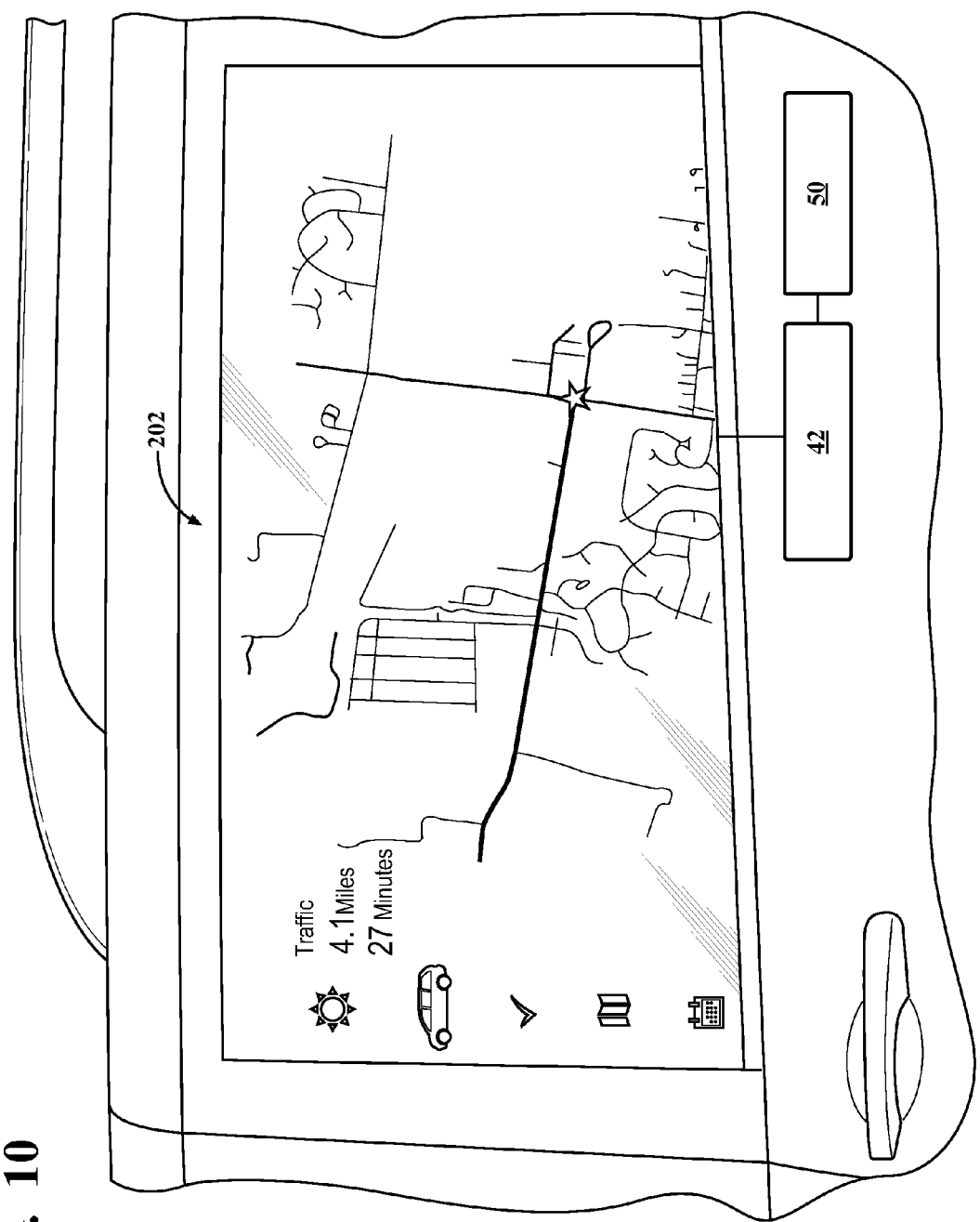
FIG. 10 is an example route page displayed by the interactive vehicle window display system.

With reference to FIG. 10, a route page 202 defaults to the predicted best route for the user with respect to an explicit or inferred next destination. Any alternate destinations or routes that can be explicit or inferred with confidence from, for example, a user personal electronic device, are presented to permit user selection by scrolling through the options. The suggested route screen is here shown accessed using the folded-map icon, however, other icons may be utilized.

Figure 11:
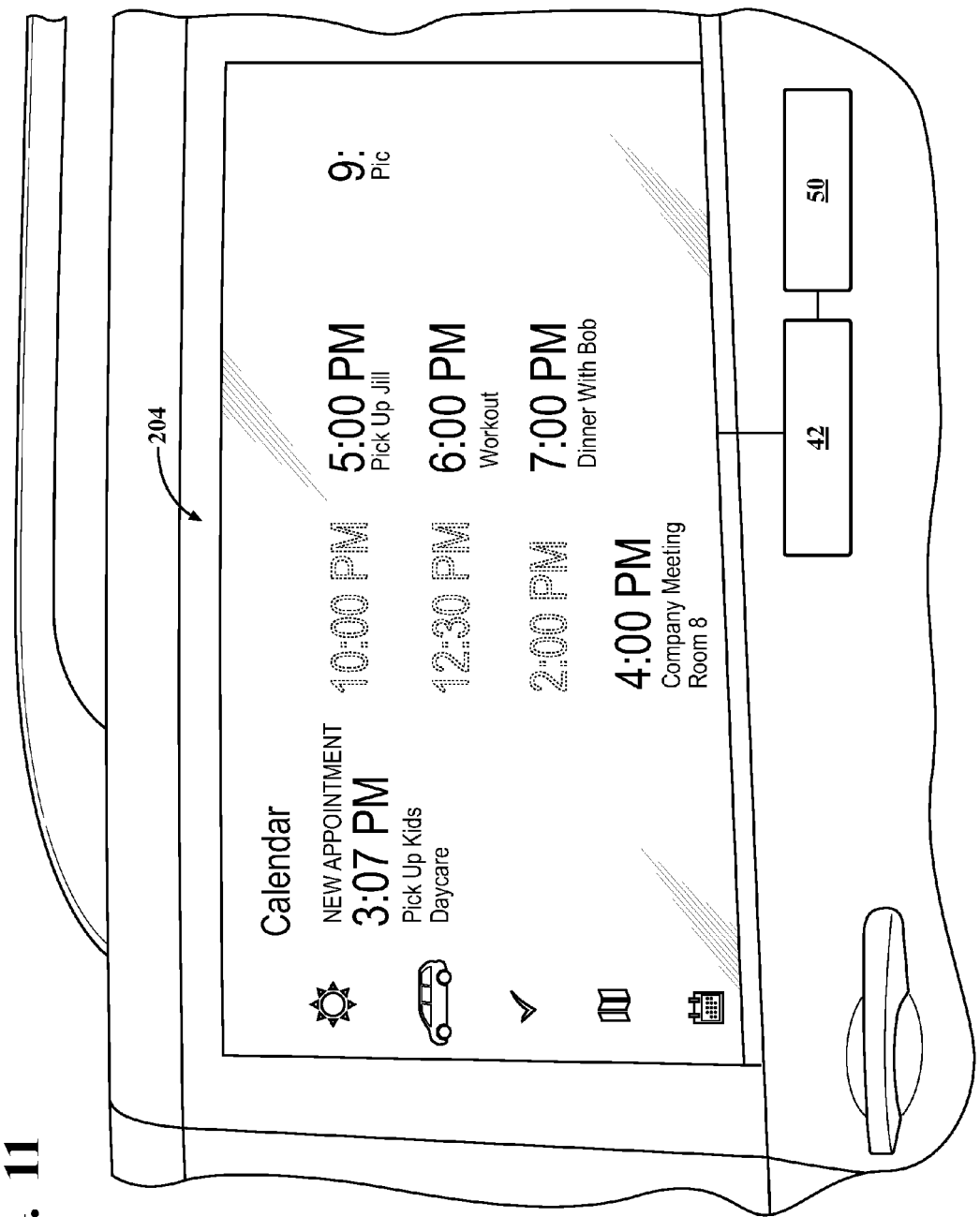
FIG. 11 is an example calendar page displayed by the interactive vehicle window display system.

With reference to FIG. 11, a calendar page 204 displays the user's calendar. In this example, the view is near-term, and shows only the next 2-3 upcoming appointments. If the event includes location information the user is also given the option to use the event for destination selection. Here shown, the calendar page 204 provides content with respect to the next appointment highlighted for the user and provides a reminder to "Pick Up Kids." The calendar screen is here shown accessed using a flip calendar icon, however, other icons may be utilized.

Figure 12:
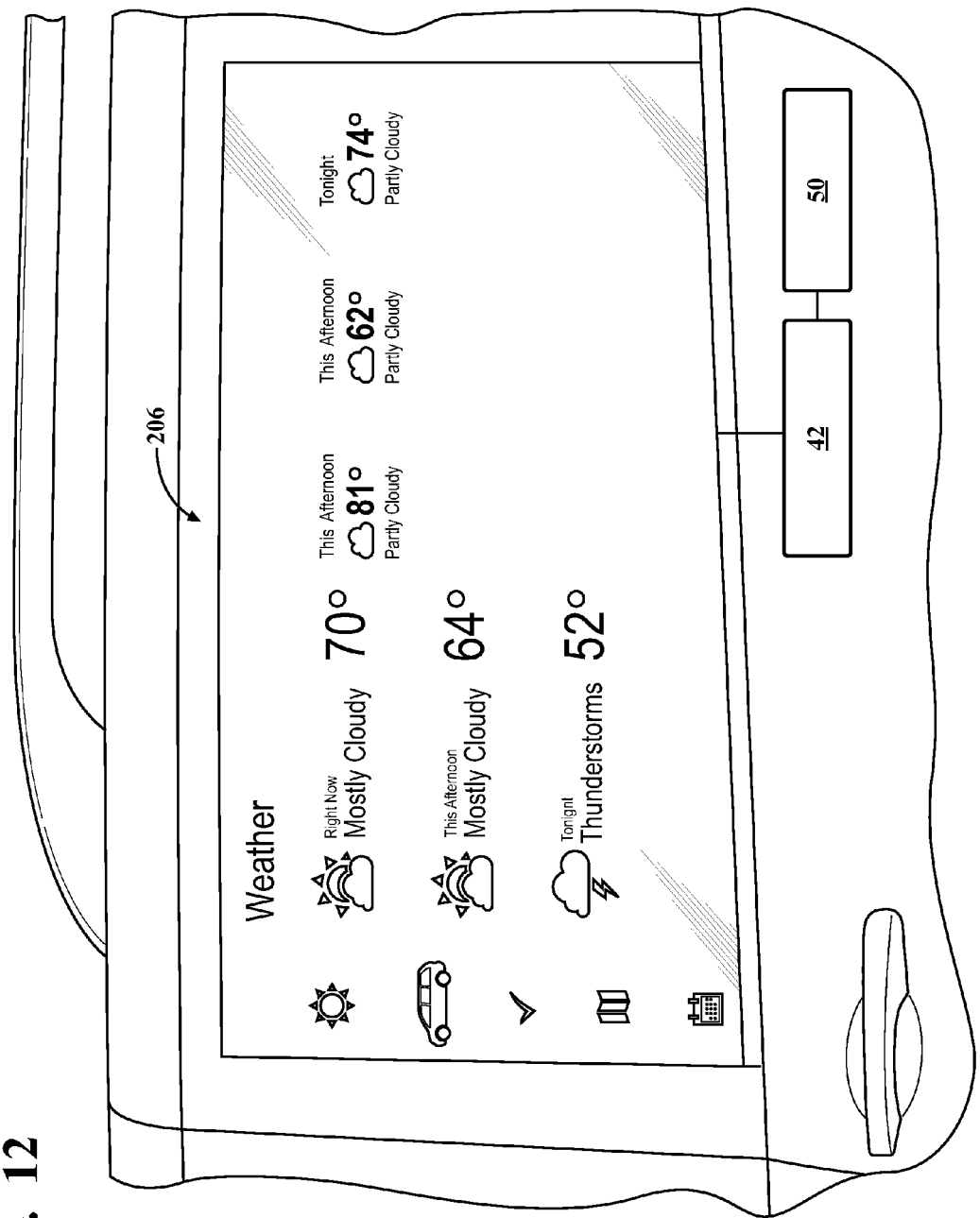
FIG. 12 is an example weather page displayed by the interactive vehicle window display system.

With reference to FIG. 12, a weather page 206 leverages information about the route to provide relevant weather information—this may be especially effective when the user is travelling away from home. For example, the system 30 determines whether it is more valuable to present the user with local weather information, destination weather information, or both, depending on the settings selected by the user or the type of weather information available. Here shown, the weather forecast is chronological. The weather page 206 can be accessed with a sun icon, however, other icons may be utilized. In addition, weather conditions can be utilized to generate a reminder for display on the landing page 200 that, for example, suggests an umbrella be placed in the vehicle if rain is forecasted.

Figure 13:
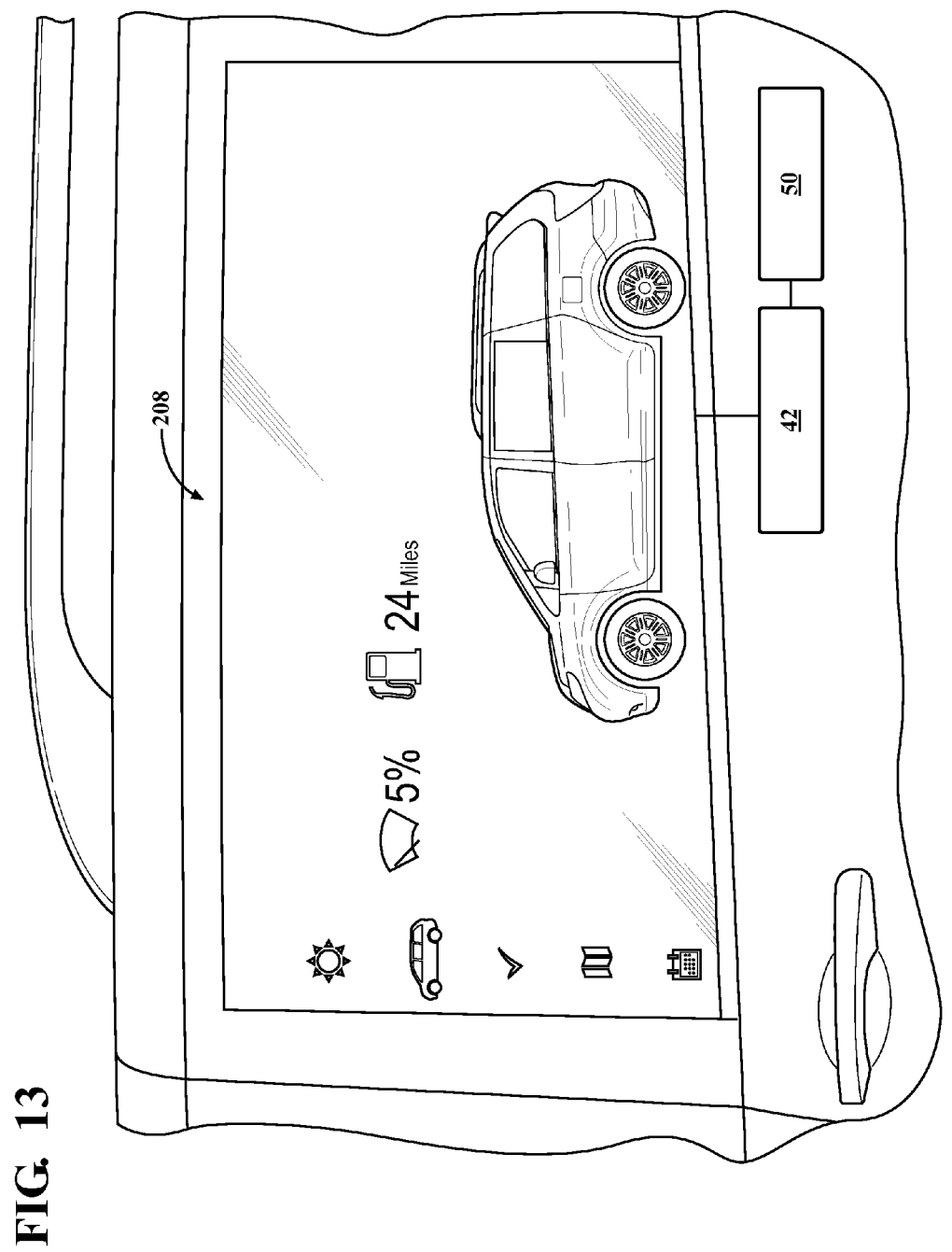
FIG. 13 is an example vehicle status page displayed by the interactive vehicle window display system.

With reference to FIG. 13, a vehicle status page 208 provides the user with a view of impending vehicle maintenance needs that requires attention. Notifications can include source details of the notification, severity, and options to resolve the potential issue. For example, given the notification of "Low Fuel," the system 30 can suggest a route to a nearby fuel station within the range of the vehicle. The vehicle status page 208 is here shown accessed with a vehicle icon, however, other icons may be utilized.

Figure 14:
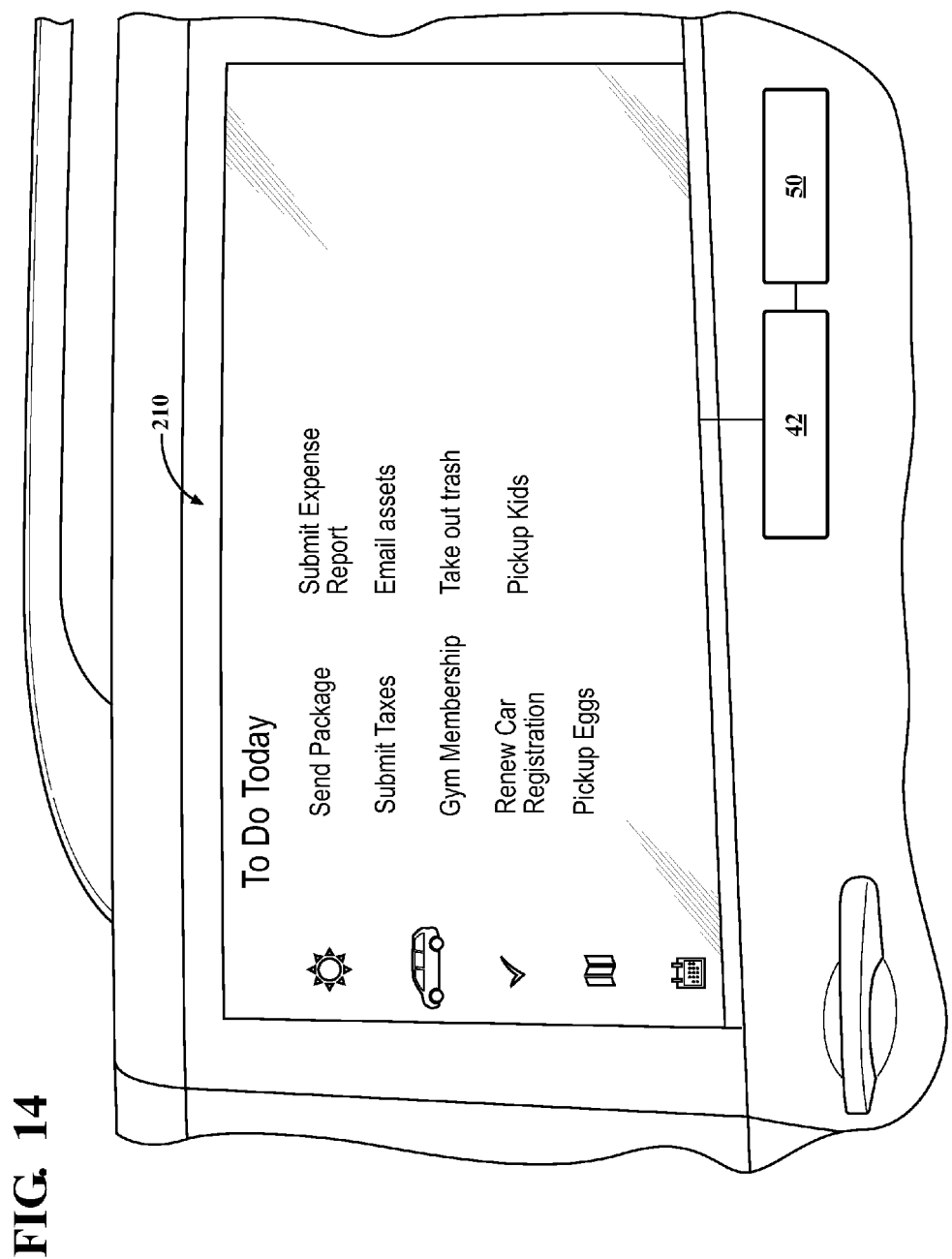
FIG. 14 is an example to-do page displayed by the interactive vehicle window display system.

With reference to FIG. 14, a to-do list page 210 presents the authorized user with information from any associated to-do list available on, for example, that user's personal electronic device 63, remote device, or web service. Here shown, the recognized user is tasked to "Send Package," "Submit Taxes," and "Renew Car Registration," among other items. The to-do list page 210 can alternatively be integrated into the route selection page if location information is included in a given list item in the personal electronic device to-do list. An example of this integration includes the provision of route details to a dry cleaner if the dry cleaning pickup is on the to-do list and the current route is proximate to the location of the dry cleaner location. The to-do list page is here shown accessed using a check-mark icon, however, other icons may be utilized.

As noted above, information of this nature, which can be included in a user profile, can in some variations be stored on or shared with a personal electronic device 63, remote server, or other cloud 70 based system, facilitating utilization in more than one vehicle. Any such information can be secured by being accessible through a password protected application running on the cloud 70 based system, by biometric authentication, or by other effective means. In some such variations, a first user can be granted partial or complete access to a second user's profile by password sharing, for example. Such sharing of access could enable a first user to write reminders or tasks from a remote location to the user profile of a second user, such as a family member, such that the reminders or tasks written by the first user will be displayed on a window when the second user approaches or enters the vehicle, or any vehicle equipped with system 30 enabled to access the user profile of the second user.

Figure 15:
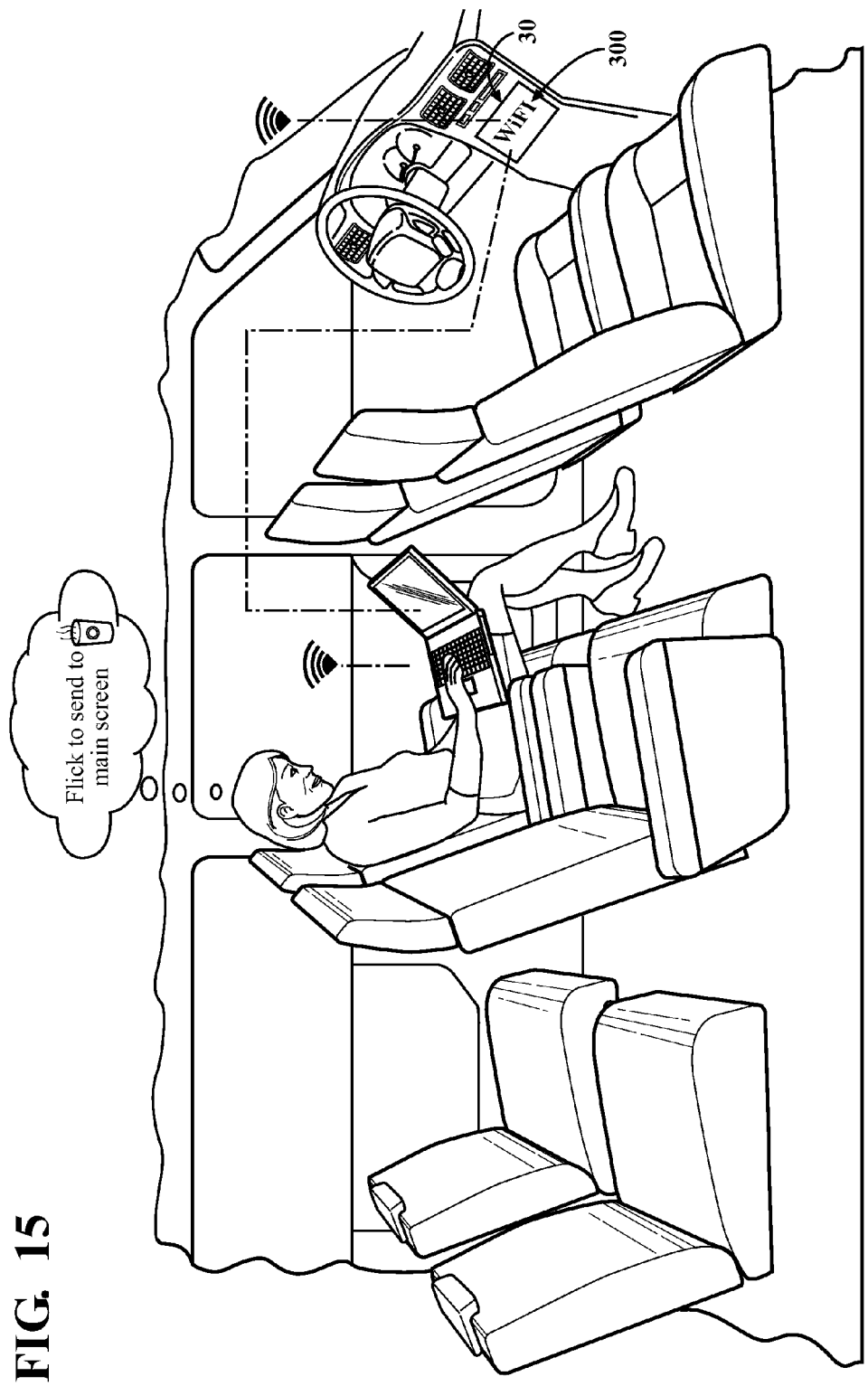
FIG. 15 is a partial interior view of a vehicle cabin illustrating an interactive environment for the driver and/or passengers to utilize functionalities of a vehicle head unit.

With reference to FIG. 15, user access to various vehicle functions can include direct or remote access to utilize functionalities of a vehicle head unit 300. With the interactivity between the vehicle head unit 300 and the system 30, and in particular between the vehicle head unit 300 and various interactive window displays, passengers can make selections with regard to vehicle systems typically performed by driver and in some cases only when the vehicle is stationary. Allowing only passengers to interact with certain vehicle systems while the vehicle is in motion increases safety by minimization of driver distraction. Passenger interaction can also enable greater functionality for the system 30. For example, a front-seat passenger can be offered more menu selections than the driver, while 2nd and 3rd row passengers can be offered even greater menu selections than the front-seat passenger. In these embodiments, the passengers can take over portions of the driver workload.

The vehicle passengers may, for example, interact with the system 30 and thereby the vehicle head unit 300 via an interactive window display or through a personal electronic device such as a smart phone or tablet which communicates therewith, through Bluetooth, RFID or other wireless technology standards to exchange data. Further, the system 30 may permit the formation of personal area networks (PANs) for vehicle passengers to share information. For example, a passenger's personal electronic device may include a mapping app operable to communicate with the vehicle navigation system on the vehicle head unit 300 with no features locked out such that the passenger can search destinations and selectively send to the vehicle navigation system via the vehicle head unit 300.

Interaction of the system 30 with the vehicle head unit 300 also allows the driver and/or passengers to select content for other vehicle passengers and/or the driver. For example, one of the passengers can select a destination to display on the navigation system for the driver while the vehicle is in motion. In another example, the driver can select entertainment content for display to child passengers. In yet another example, the passenger can control infotainment or climate control features controlled by the vehicle head unit 300.

Figure 16:
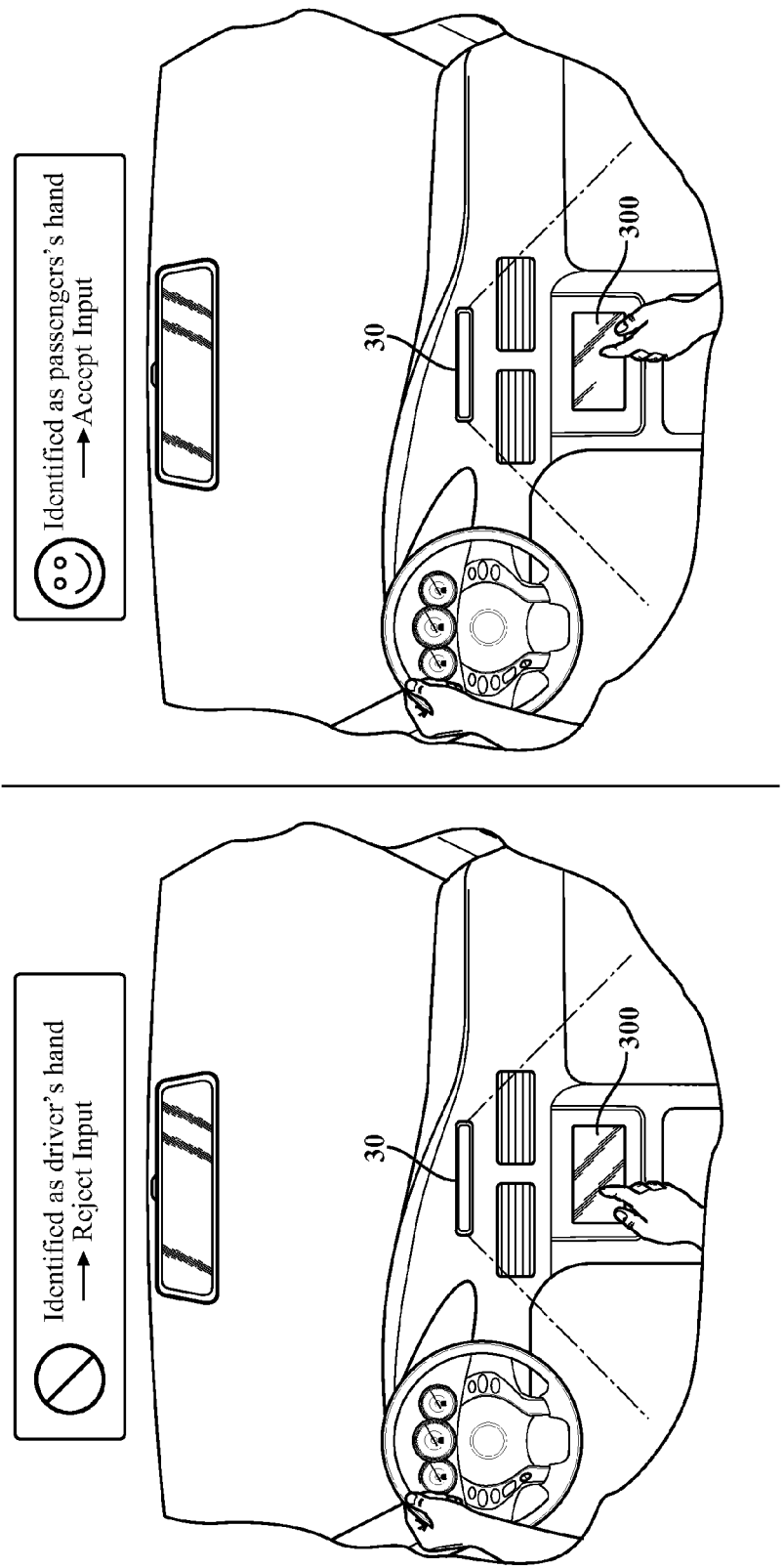
FIG. 16 is a partial interior view of the vehicle cabin illustrating discrimination of a driver and/or passenger to selectively permit utilization of functionalities of a vehicle head unit during vehicle operation.
Figure 17:
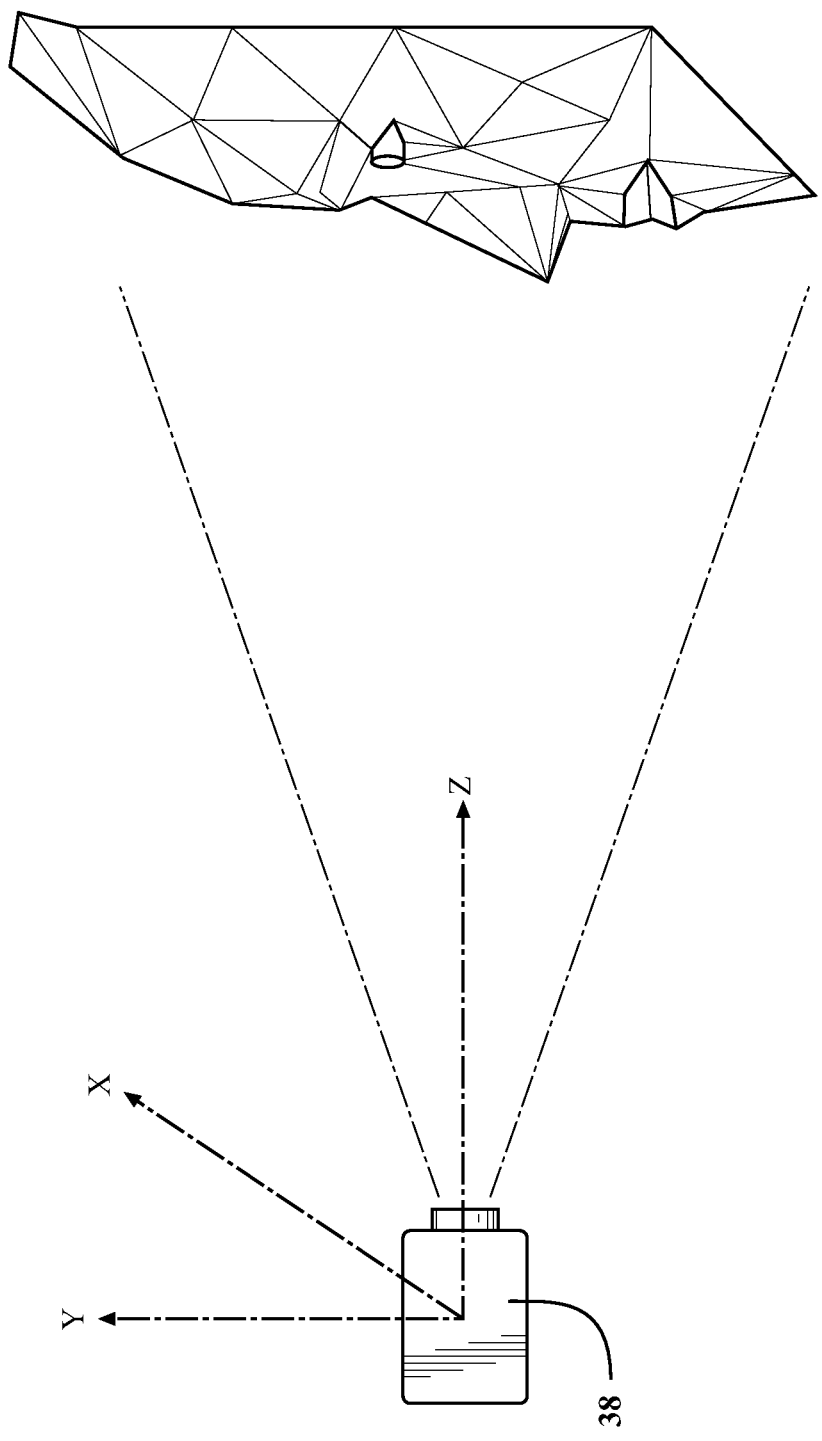
FIG. 17 is a pictorial representation of a vehicle passenger facial map for use with the system to track occupant location.
Figure 18:
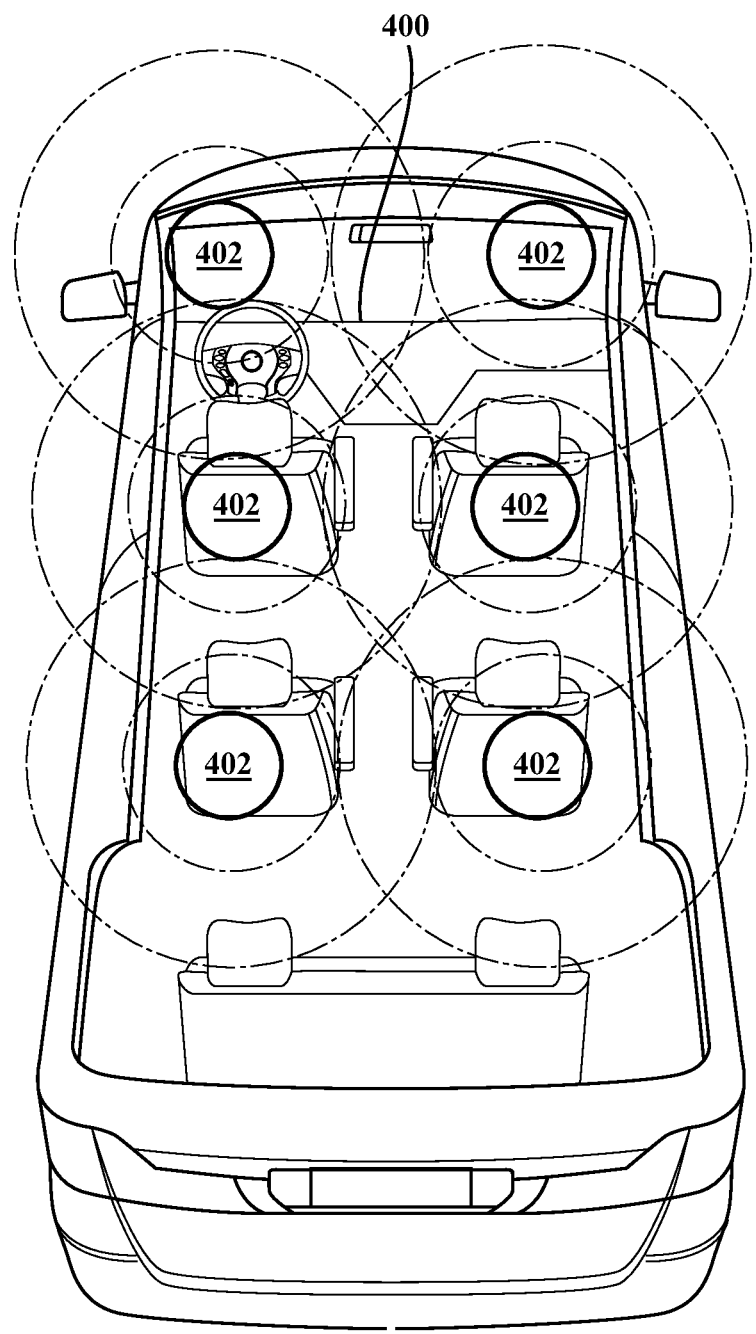
FIG. 18 is an overhead interior view of the vehicle illustrating a sensor arrangement to track occupant location within the vehicle cabin.

With reference to FIG. 16, and in one non-limiting example of the operation of the user location subsystem 39, to still further increase safety through driver distraction minimization, the system 30, by utilizing user location subsystem 39, is operable to track the location or position of the vehicle occupants within the vehicle cabin 400 (FIG. 18) through skeletal position (FIG. 16), facial map data (FIG. 17), pressure sensors, interactive window display input sensors, or others. For a three row vehicle, for example, three distinct areas are tracked—front row, middle row and rear row. Typically, at least two sensors 402 per row are required to track a state of each occupant within the vehicle 20. In some instances, each individual seat in the vehicle 20 can be tracked. The data from all sensors 402 may alternatively or additionally be combined to create one central map (2D or 3D) for use by the system 30. It should be appreciated that the sensors 402 may communicate with, or be a portion of, the user identification subsystem 38, the user location subsystem 39, or both.

Given that the vehicle occupants are typically seated and belted, the multi-point skeletal joint relationship and facial recognition map data provides a relatively accurate position of each occupant captured on an XYZ axis map that can track, to a desired level of precision, the state of each occupant at a specific snapshot in time. The state of each occupant facilitates further tailored operations for various vehicle functions. For example, the user location subsystem 39 detects and discriminates between a driver's hand from that of a vehicle front row passenger hand to selectively unlock various head unit functionality such as navigation route selection (FIG. 16). Dependent, for example, on which user (driver or passenger) is attempting to access the system 30 and whether the vehicle is in motion, content menu items of the vehicle head unit 300 are selectively displayed. For example, certain content such as route selection may be color coded for only passenger access, while other content such as zooming and scrolling may always be available regardless of user.

Upon approach to the vehicle, the system 30 beneficially recognizes a user with a first and second point of identification to display information for that particular, authorized user. This authentication process ensures the security of the vehicle and the personal information embedded in the system 30 yet permits vehicle interaction prior to user entry into the vehicle cabin. The system 30 also beneficially discriminates passengers from the driver to selectively permit access to personalized content or specific vehicle system interfaces.

Figure 19:
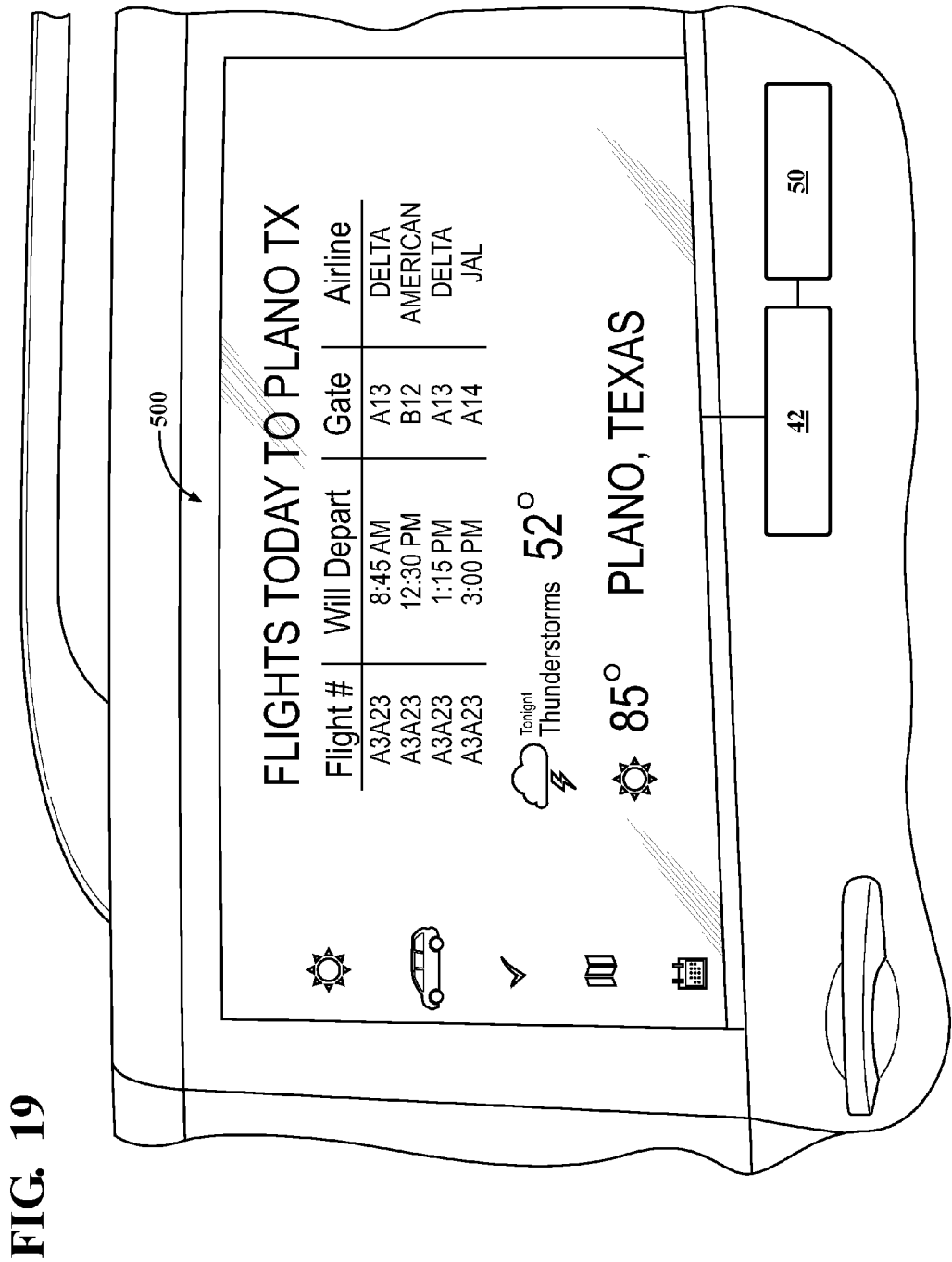
FIG. 19 is an example personal reminder page for a travel related reminder displayed by the interactive vehicle window display system.

With reference to FIG. 19, a personal convenience reminder page 500 provides personal convenience reminders during "walk-up" or at other times during user/vehicle interactions. The personal convenience reminder page 500 in these examples may include reminders specific to the user and associated with weather, travel and/or other reminders personalized to the user. The system 30 is operable to access a user's calendar, an off board weather applications, an off board traffic applications, or other off board application such as that typically accessible over the Internet.

In one disclosed non-limiting embodiment, the personal convenience reminder page 500 provides a personal reminder associated with travel. The system 30 accesses an off board system such as the user input subsystem 36 to view the user's calendar. That is, the user input subsystem 36 includes the personal electronic device 63 of the user, e.g. a tablet, smart phone, or other mobile device. Here shown, the user's calendar indicates upcoming travel to the destination of Plano, Tex.

Should the user's calendar not include particular details for the upcoming flight, the system 30 will utilize the information access other off board applications to provide further selections to the user. That is, the system 30 is operable to access off board applications in response to information in the user input subsystem 36 to further refine the personal convenience reminders in response to a user selection. For example, the system 30 is operable to show details associated with the destination in the user's calendar, such as weather information accessed via an off board weather applications. Further, the system 30 is operable to display an airline departure board for all flights from the user's current location to the destination indicated in the user's calendar, here shown as Plano, Tex., should such details not be stored in the user input subsystem 36. That is, the information in the user's calendar is utilized to search off board applications and categorize upcoming flights from the user's current location to the destination indicated in the user's calendar.

Figure 20:
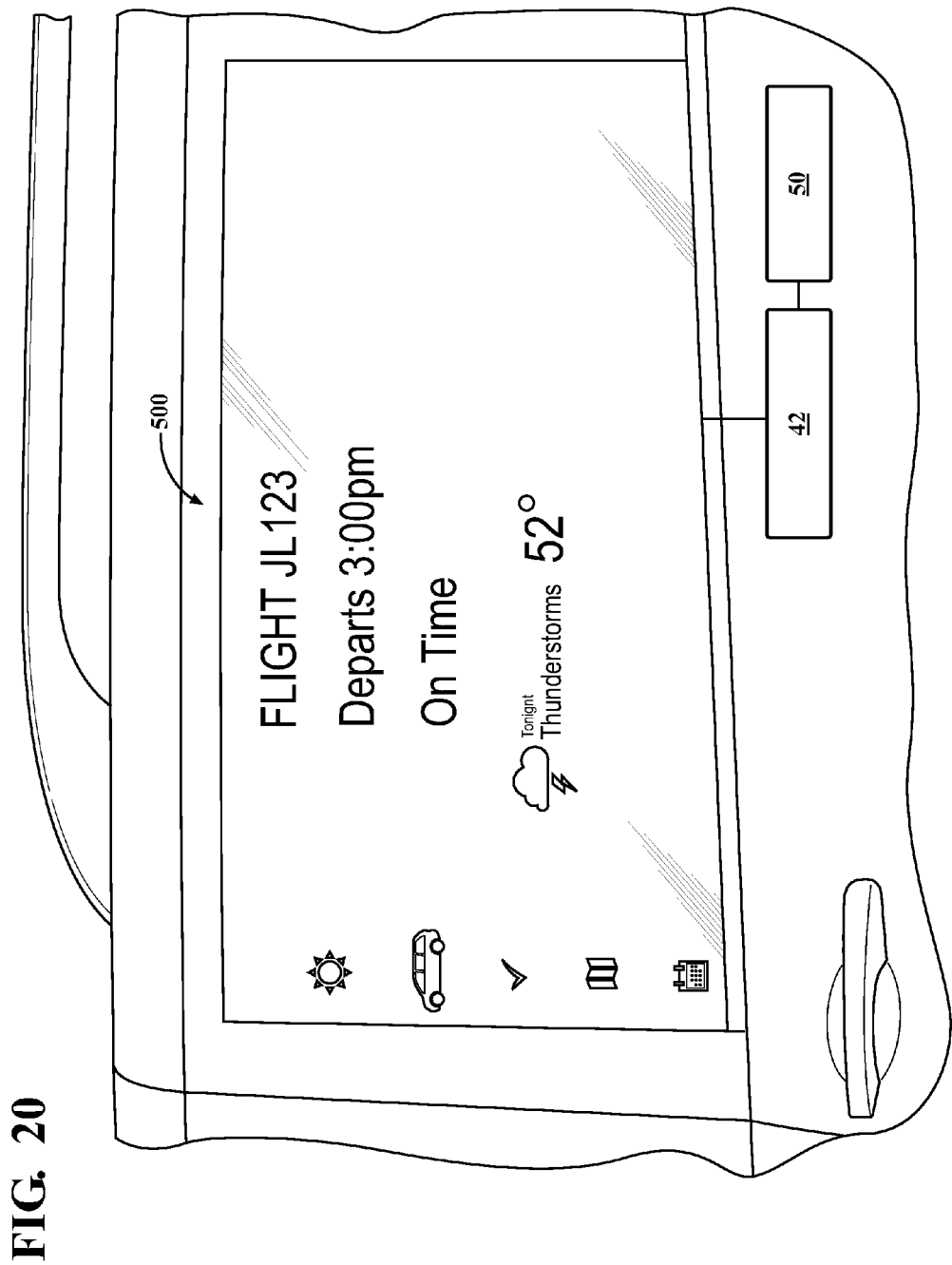
FIG. 20 is an example personal reminder page that is selected from the page of FIG. 19.

The system 30 will then display the categorized flight information from the list of upcoming flights to Plano, Tex. and request a selection by the user. That is, the system 30 prompts the user for a selection of a particular flight from the airline departure board. Once the user selects the particular flight, the system 30 will then indicate specific information for the selected flight, such as departure times, ETA, delays, and the like (FIG. 20). Alternatively, should the user's calendar indicate the exact flight, the personal convenience reminder page 500 will display the specific flight information directly (FIG. 20).

Figure 21:
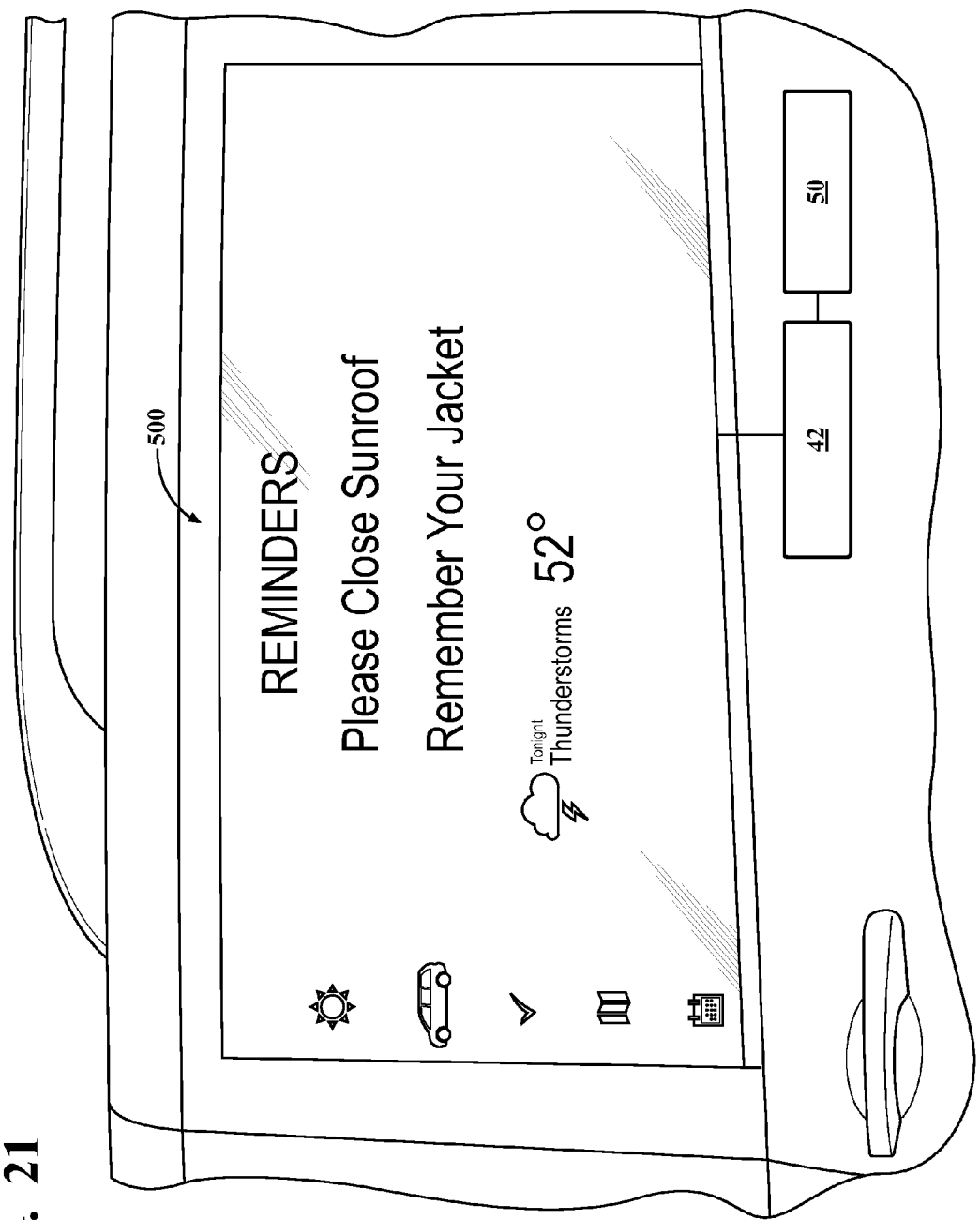
FIG. 21 is an example personal reminder page for a weather related reminder displayed by the interactive vehicle window display system.

With reference to FIG. 21, in another disclosed non-limiting embodiment, if the system 30 identifies upcoming weather-related information that would be of interest to the user, the system 30 will display an appropriate weather reminder. For example, if the user exits the vehicle with a sunroof open and rain is in the forecast, the system 30 may issue a weather-related personal reminder associated with the vehicle such "Please Close Sunroof."

As still another example, if rain is in the forecast, the system 30 may issue a weather-related personal reminder associated with the user such as, "Remember Your Jacket."

As still another example, the system 30 may provide a reminder for a rent-a-car reservation at a destination area and a connection to the rent-a-car agency to facilitate check out.

As still another example, the system 30 may recommend a particular restaurant or refueling station depending upon a time to a destination.

As still another example, the system 30 may provide a reminder or promotion for shopping coupons in response to the destination of the user.

The use of the terms "a," "an," "the," and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason the appended claims should be studied to determine true scope and content.

What is claimed is:

1. A system for a vehicle, comprising:
a user input subsystem configured to receive input from a remote device, the input generated by a first user of the vehicle and including a personal convenience reminder for a second user of the vehicle;
a user identification subsystem configured to authenticate the second user when the second user is approaching the vehicle and to determine a direction from which the second user approaches, the determining of the direction from which the second user approaches is based on detected locations of the second user as the second user approaches the vehicle; and
a display subsystem configured to generate output for display on a vehicle window, the window selected to face the direction from which the second user approaches, and the output comprising the personal convenience reminder obtained from the user input subsystem.

2. The system as recited in claim 1, wherein the output for display includes an airline departure board for all flights from a current location of the user to a destination indicated in the user input subsystem in response to accessing an off board application.

3. The system as recited in claim 2, wherein the user input subsystem is configured to receive a selection of a flight from the airline departure board.

4. The system as recited in claim 3, wherein the user input subsystem is configured to receive the selection via a key fob.

5. The system as recited in claim 3, wherein the output for display comprises specific information for the selected flight.

6. The system as recited in claim 5, wherein the specific information for the selected flight includes a departure time.

7. The system as recited in claim 1, wherein the output is displayed on the outside of the vehicle window.

8. The system as recited in claim 1, wherein the output includes a weather-related personal convenience reminder associated with the vehicle.

9. The system as recited in claim 1, wherein the output includes a weather-related personal convenience reminder associated with the second user.

10. The system as recited in claim 1, wherein the output includes a weather-related personal convenience reminder associated with a destination of the second user.

11. A method of operating a system for a vehicle, comprising:
receiving input from a remote device, the input generated by a first user of the vehicle and including a personal convenience reminder for a second user of the vehicle;
identifying, with a user identification subsystem, the second user when the second user is approaching the vehicle, the user identification subsystem comprising at least one user identification sensor configured to capture user data when a user is located outside of the vehicle, wherein identifying the second user when the second user is approaching the vehicle is at least partially based on a skeleton joint relationship using user data captured by at least one identification sensor; and
generating an output for display on a vehicle window in response to identification of the second user, the output associated with the personal convenience reminder, the generating being performed when the second user approaches the vehicle, when the second user exits the vehicle, or both.

12. The method as recited in claim 11, wherein the output is displayed on the outside of the vehicle window.

* * * * *

UNITED STATES PATENT AND TRADEMARK OFFICE
CERTIFICATE OF CORRECTION

PATENT NO. : 9,902,266 B2
APPLICATION NO. : 14/461427
DATED : February 27, 2018
INVENTOR(S) : James T. Pisz et al.

Page 1 of 1

It is certified that error appears in the above-identified patent and that said Letters Patent is hereby corrected as shown below:

In the Claims

Claim 2, Column 13, Line 1: delete "the user to a destination" and insert --the first user or a current location of the second user to a destination--.

Signed and Sealed this
Twenty-fourth Day of April, 2018

Andrei Iancu
*Director of the United States Patent and Trademark Office*